United States Patent
Shigemori

(10) Patent No.: US 10,599,265 B2
(45) Date of Patent: Mar. 24, 2020

(54) ELECTRONIC DEVICE AND TOUCH PANEL INPUT METHOD

(71) Applicant: Semiconductor Energy Laboratory Co., Ltd., Kanagawa-ken (JP)

(72) Inventor: Isamu Shigemori, Kanagawa (JP)

(73) Assignee: Semiconductor Energy Laboratory Co., Ltd. (JP)

(*) Notice: Subject to any disclaimer, the term of this patent is extended or adjusted under 35 U.S.C. 154(b) by 184 days.

(21) Appl. No.: 15/813,897

(22) Filed: Nov. 15, 2017

(65) Prior Publication Data

US 2018/0136786 A1 May 17, 2018

(30) Foreign Application Priority Data

Nov. 17, 2016 (JP) ................. 2016-224110

(51) Int. Cl.
| | | |
|---|---|---|
| *G06F 3/041* | (2006.01) | |
| *G06F 1/16* | (2006.01) | |
| *G06F 3/044* | (2006.01) | |
| *G06F 3/047* | (2006.01) | |
| *G02F 1/1333* | (2006.01) | |

(52) U.S. Cl.
CPC .......... *G06F 3/0418* (2013.01); *G06F 1/1643* (2013.01); *G06F 3/044* (2013.01); *G06F 3/047* (2013.01); *G06F 3/0412* (2013.01); *G02F 1/13338* (2013.01); *G06F 2203/0339* (2013.01); *G06F 2203/04103* (2013.01); *G06F 2203/04112* (2013.01)

(58) Field of Classification Search
CPC ...... G06F 3/0418; G06F 3/0412; G06F 3/044; G06F 3/047; G06F 1/1643; G06F 2203/0339; G06F 2203/04103; G06F 2203/04112; G02F 1/13338
See application file for complete search history.

(56) References Cited

U.S. PATENT DOCUMENTS

| | | |
|---|---|---|
| 8,797,304 B2 | 8/2014 | Koyama et al. |
| 9,158,412 B2 | 10/2015 | Koyama et al. |
| 9,459,719 B2 | 10/2016 | Ikeda et al. |

(Continued)

FOREIGN PATENT DOCUMENTS

| | | |
|---|---|---|
| JP | 3166363 | 3/2011 |
| JP | 2014-232525 A | 12/2014 |

*Primary Examiner* — Peter D McLoone
(74) *Attorney, Agent, or Firm* — Husch Blackwell LLP

(57) ABSTRACT

Provided is an electronic device including an input means using a touch panel with which incorrect operations is reduced. When people whose arms, hands, or fingers involuntarily shake because of cerebral palsy or the like use an input system including a touch panel, incorrect touch might occur in input operation. To prevent this, a touch input system in which a cover for preventing incorrect touch is provided over a touch panel to reduce incorrect operations is provided. However, since there is a region that is hard to touch using the cover, electronic devices including such touch panels are not sufficiently widely used. Thus, novel touch panels are provided outside a display region where the cover is provided. The touch panels have a function of selecting first and second regions. The first and second regions intersect with each other to provide a third region. A display object displayed in a region overlapping with the third region is configured to be extracted and executed.

19 Claims, 21 Drawing Sheets

(56) References Cited

U.S. PATENT DOCUMENTS

| | | |
|---|---|---|
| 9,626,889 B2 | 4/2017 | Iwaki |
| 9,875,015 B2 | 1/2018 | Yamazaki et al. |
| 2011/0128264 A1* | 6/2011 | Lee ................. G02F 1/1334 345/207 |
| 2013/0009909 A1 | 1/2013 | Yamazaki et al. |
| 2013/0141367 A1* | 6/2013 | Kawase ............. G06F 3/041 345/173 |
| 2014/0106814 A1* | 4/2014 | Schmidt ............ H04W 88/02 455/556.1 |
| 2014/0240362 A1 | 8/2014 | Kurita |
| 2014/0325249 A1 | 10/2014 | Toyotaka |
| 2015/0103023 A1 | 4/2015 | Iwaki |
| 2015/0316995 A1 | 11/2015 | Tamaki |
| 2016/0043149 A1* | 2/2016 | Sagardoyburu ..... G02F 1/13306 349/96 |
| 2017/0220188 A1 | 8/2017 | Iwaki |
| 2017/0262107 A1 | 9/2017 | Kimura et al. |
| 2018/0113566 A1 | 4/2018 | Shigemori |

* cited by examiner

FIG. 9A
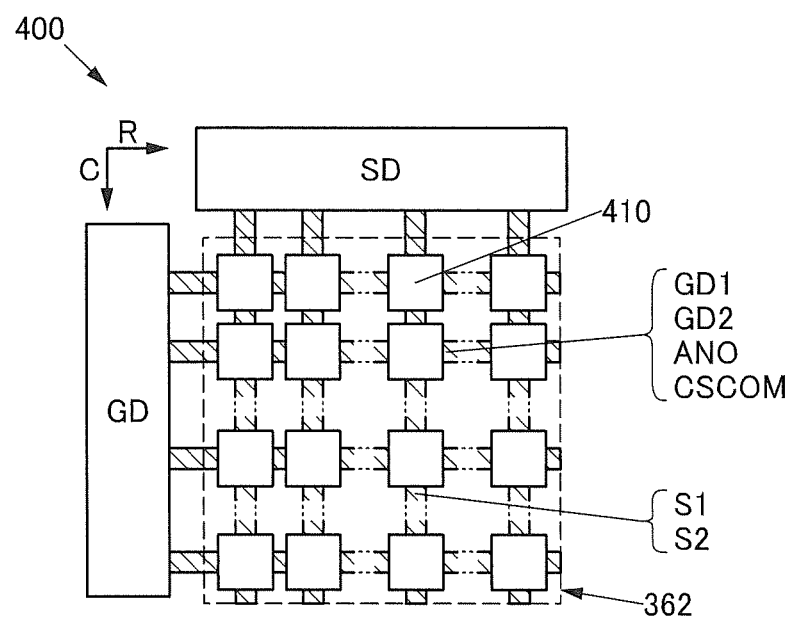
FIG. 9B1
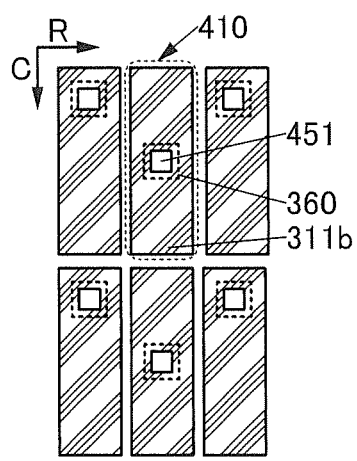
FIG. 9B2
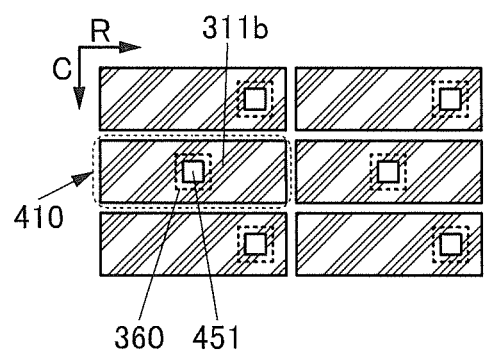

FIG. 17A1
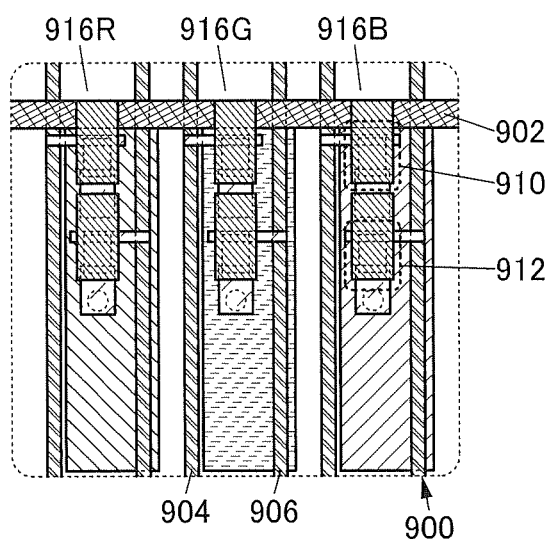
FIG. 17A2
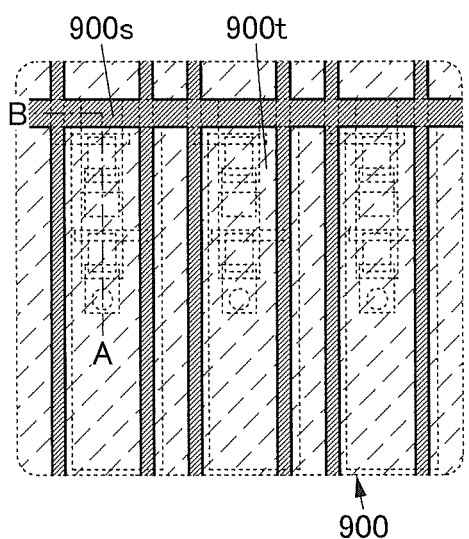
FIG. 17B
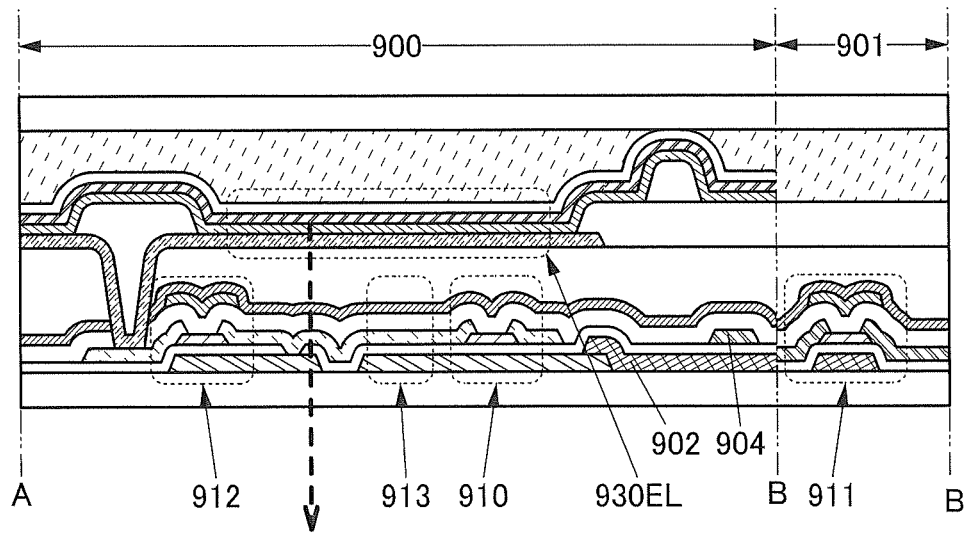

FIG. 18A1
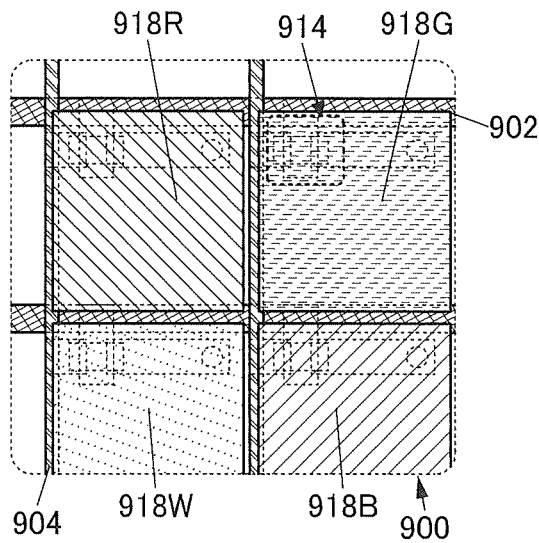
FIG. 18A2
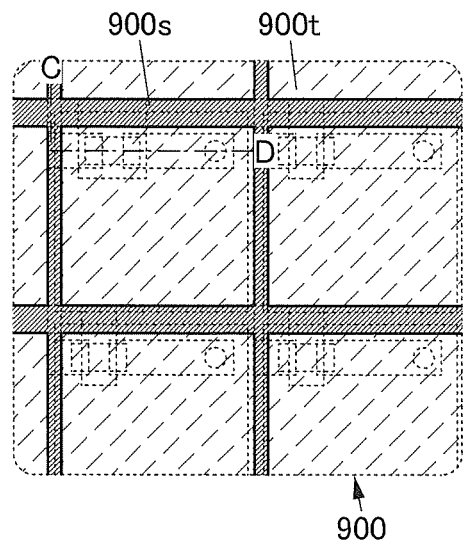
FIG. 18B
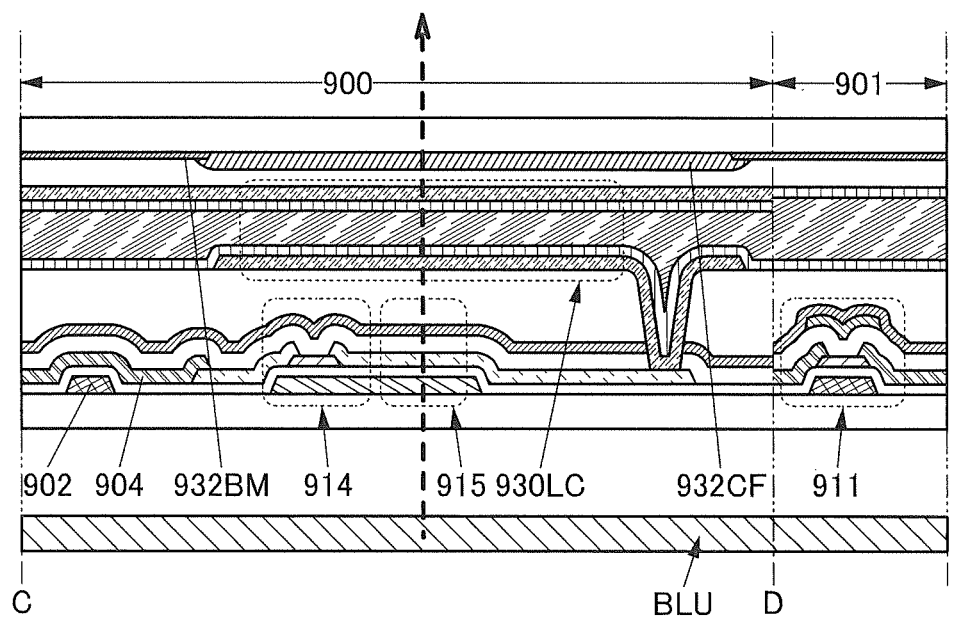

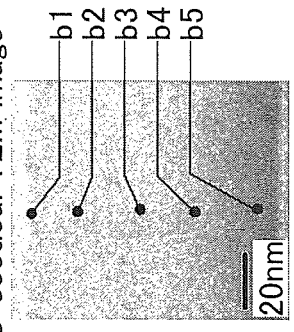
FIG. 20A Plan-view TEM image
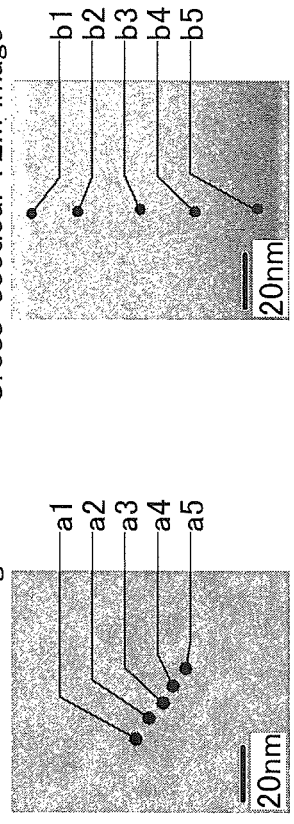
FIG. 20B Cross-sectional TEM image
FIG. 20C · FIG. 20D · FIG. 20E · FIG. 20F · FIG. 20G
FIG. 20H · FIG. 20I · FIG. 20J · FIG. 20K · FIG. 20L

ELECTRONIC DEVICE AND TOUCH PANEL INPUT METHOD

BACKGROUND OF THE INVENTION

1. Field of the Invention

One embodiment of the present invention relates to an electronic device and a touch panel input method.

Note that one embodiment of the present invention is not limited to the above technical field. The technical field of one embodiment of the invention disclosed in this specification and the like relates to an object, a method, or a manufacturing method. The present invention relates to a process, a machine, manufacture, or a composition of matter. One embodiment of the present invention particularly relates to a semiconductor device, a display device, a light-emitting device, a power storage device, a storage device, a touch detection device, a driving method thereof, or a manufacturing method thereof.

In this specification and the like, a semiconductor device refers to an element, a circuit, a device, or the like that can function by utilizing semiconductor characteristics. An example of the semiconductor device is a semiconductor element such as a transistor or a diode. Another example of the semiconductor device is a circuit including a semiconductor element. Another example of the semiconductor device is a device provided with a circuit including a semiconductor element.

2. Description of the Related Art

Electronic devices such as smartphones, tablets, electronic book readers, notebook personal computers, and digital watches are widely used. Such electronic devices are small and highly portable, and include touch panels that can be handled easily by operators.

Electronic devices have been frequently used as easy communication tools also by people who cannot move part of their bodies freely because of cerebral palsy or the like; thus, the reliability of an input operation method needs to be ensured.

Patent Document 1, for example, discloses a cover that can support touch input through input keys displayed on an electronic device including a touch panel.

A transistor including an oxide semiconductor has excellent electrical characteristics of an extremely low off-state current. Examples of a memory that effectively utilizes the electrical characteristics of the transistor including an oxide semiconductor include a dynamic oxide semiconductor random access memory (DOSRAM) and a non-volatile oxide semiconductor random access memory (NOSRAM). Patent Document 2 discloses an electronic device including a processing device having a NOSRAM or a DOSRAM.

REFERENCE

Patent Documents

[Patent Document 1] Japanese Published Unexamined Utility Model Registration No. 3166363
[Patent Document 2] Japanese Published Patent Application No. 2014-232525

SUMMARY OF THE INVENTION

An electronic device including a touch panel is an easily operable electronic device. However, when people whose fingers (or arms, hands, or the like) involuntarily shake input data using an input device such as a touch panel of an electronic device, incorrect touch might occur. In touch operation on a small display object (hereinafter, an icon) or the like, a plurality of icons might be selected.

To prevent this, an input device such as a touch panel is provided with a cover for preventing incorrect touch. However, since the touch panel is positioned to overlap with a display region, a display object under the cover for preventing incorrect touch cannot be touched freely when the cover is provided over the touch panel.

In view of the above problems, an object of one embodiment of the present invention is to provide a novel touch input method. Another object of one embodiment of the present invention is to provide an electronic device with improved operability.

Note that the descriptions of these objects do not disturb the existence of other objects. In one embodiment of the present invention, there is no need to achieve all the objects. Other objects will be apparent from and can be derived from the description of the specification, the drawings, the claims, and the like.

Note that the objects of one embodiment of the present invention are not limited to the above objects. The objects described above do not disturb the existence of other objects. The other objects are ones that are not described above and will be described below. The other objects will be apparent from and can be derived from the description of the specification, the drawings, and the like by those skilled in the art. One embodiment of the present invention solves at least one of the above objects and the other objects.

One embodiment of the present invention is an electronic device including a first housing, a display panel, a first touch sensor, a second touch sensor, a third touch sensor, a first switch, and a second switch. The first touch sensor has a region overlapping with the display panel. The display panel has a first side and a second side. The second touch sensor is along the first side. The third touch sensor is along the second side. The first side and the second side are not parallel to each other. The first switch is positioned near the second touch sensor. The second switch is positioned near the third touch sensor.

Another embodiment of the present invention is an electronic device including a first housing and a second housing. The first housing has a structure for storing the second housing. The first housing includes a second touch sensor, a third touch sensor, a first switch, a second switch, a first communication module, and an opening region. The second housing includes a display panel, a first touch sensor, a processor, and a second communication module. The opening region is positioned to overlap with the display panel. The first communication module is configured to transmit touch coordinate data detected by one of the second touch sensor and the third touch sensor to the second communication module. The first communication module is configured to transmit a detection signal detected by one of the first switch and the second switch to the second communication module. The processor is configured to receive the touch coordinate data or the detection signal via the second communication module. The processor is configured to control display on the display panel by using one of the received touch coordinate data and the received detection signal.

In the above electronic device, the display panel preferably has three or more sides.

The above electronic device preferably has the following structure: the display panel has a display region; the display region includes a plurality of pixels; each of the pixels includes a first pixel circuit and a second pixel circuit; the first pixel circuit includes a first display element; the second pixel circuit includes a second display element; the first display element includes a reflective electrode; the first display element is configured to reflect light from the outside by the reflective electrode to display an image; the reflective electrode has an opening region or a notch region; and the second display element is configured to emit light that passes the opening region or the notch region to display an image.

In the above electronic device, the first display element is preferably a reflective liquid crystal element.

In the above electronic device, the second display element is preferably a light-emitting element.

The above electronic device is preferably configured to display an image using one or both of first light reflected from the first display element and second light emitted from the second display element.

The above electronic device preferably includes a transistor. The transistor preferably contains a metal oxide in a semiconductor layer.

In the above electronic device, the transistor containing a metal oxide in the semiconductor layer preferably includes a back gate.

The above electronic device preferably employs the following touch panel input method. The second touch sensor outputs a first touch coordinate after detecting touch. The third touch sensor outputs a second touch coordinate after detecting touch. The display panel displays a first region extending from the first touch coordinate in a direction perpendicular to a long side of the second touch sensor. The display panel displays a second region extending from the second touch coordinate in a direction perpendicular to a long side of the third touch sensor.

In the above touch panel input method, the display panel preferably has a third region where the first region and the second region intersect with each other. A display object displayed in a region overlapping with the third region is preferably configured to be extracted and an application program associated with the display object is preferably configured to be executed.

In the above touch panel input method, a selected display of the first region is preferably deselected when a detection signal from the first switch is detected, and a selected display of the second region is preferably deselected when a detection signal from the second switch is detected.

In the above touch panel input method, a gray level or a color tone of a display object in the third region is preferably changed to clearly show that the display object is selected.

One embodiment of the present invention can provide a novel touch input method. Another embodiment of the present invention can provide an electronic device with improved operability.

Note that the effects of one embodiment of the present invention are not limited to the above effects. The effects described above do not disturb the existence of other effects. The other effects are ones that are not described above and will be described below. The other effects will be apparent from and can be derived from the description of the specification, the drawings, and the like by those skilled in the art. One embodiment of the present invention has at least one of the above effects and the other effects. Accordingly, one embodiment of the present invention does not have the aforementioned effects in some cases.

BRIEF DESCRIPTION OF THE DRAWINGS

FIG. 9A illustrates a circuit of a display device, and FIGS. 9B1 and 9B2 are top views of pixels.

FIGS. 17A1, 17A2, and 17B are top views and a cross-sectional view each illustrating an example of a pixel.

FIGS. 18A1, 18A2, and 18B are top views and a cross-sectional view each illustrating an example of a pixel.

FIGS. 20A and 20B are TEM images of samples and FIGS. 20C to 20L are electron diffraction patterns thereof.

DETAILED DESCRIPTION OF THE INVENTION

Figure 1A:
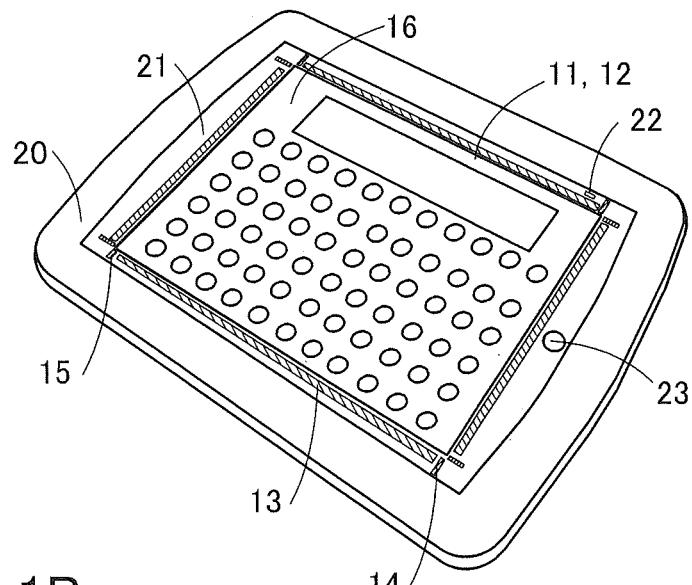
FIGS. 1A and 1B each illustrate a structure of an electronic device.

Embodiments will be hereinafter described with reference to drawings. Note that the embodiments can be implemented in many different modes. It will be readily appreciated by those skilled in the art that modes and details can be changed in various ways without departing from the spirit and scope of the present invention. Therefore, the present invention should not be interpreted as being limited to the description in the following embodiments.

In the drawings, the size, the layer thickness, or the region is exaggerated for clarity in some cases. Therefore, embodiments of the present invention are not limited to such a scale. Note that the drawings are schematic views illustrating ideal examples, and embodiments of the present invention are not limited to shapes or values illustrated in the drawings.

Ordinal numbers such as "first," "second," and "third" in this specification are used in order to avoid confusion among components, and the terms do not limit the components numerically.

In this specification, terms for describing arrangement, such as "over" and "under," are used for convenience for describing the positional relation between components with reference to drawings. The positional relation between components is changed as appropriate in accordance with a direction in which each component is. described. Thus, there is no limitation on terms used in this specification, and description can be made appropriately depending on the situation.

In this specification and the like, a transistor is an element having at least three terminals of a gate, a. drain, and a source. The transistor includes a channel region between the drain (a drain terminal, a drain region, or a drain electrode) and the source (a source terminal, a source region, or a source electrode) and current can flow between the source and the drain through the channel region. Note that in this specification and the like, a channel region refers to a region through which current mainly flows.

Functions of a "source" and a "drain" are sometimes interchanged with each other when a transistor of opposite polarity is used or when the direction of current flow is changed in circuit operation, for example. Therefore, the terms "source" and "drain" can be interchanged with each other in this specification and the like.

In this specification and the like, the term "electrically connected" includes the case where components are connected through an "object having any electric function." There is no particular limitation on an "object having any electric function" as long as electric signals can be transmitted and received between components that are connected through the object. Examples of an "object having any electric function" include a switching element such as a transistor, a resistor, an inductor, a capacitor, and an element with a variety of functions, as well as an electrode and a wiring.

In this specification and the like, the term "parallel" indicates that the angle formed between two straight lines is greater than or equal to −10° and less than or equal to 10°, and accordingly also includes the case where the angle is greater than or equal to −5° and less than or equal to 5°. In addition, the term "perpendicular" indicates that the angle formed between two straight lines is greater than or equal to 80° and less than or equal to 100°, and accordingly also includes the case where the angle is greater than or equal to 85° and less than or equal to 95°.

In this specification and the like, the terms "film" and "layer" can be interchanged with each other. For example, the term "conductive layer" can be changed into the term "conductive film" in some cases. Also, the term "insulating film" can be changed into the term "insulating layer" in some cases.

Unless otherwise specified, the off-state current in this specification and the like refers to a drain current of a transistor in the off state (also referred to as non-conduction state and cutoff state). Unless otherwise specified, the off state of an n-channel transistor means that the voltage between its gate and source ($V_{gs}$: gate-source voltage) is lower than the threshold voltage $V_{th}$, and the off state of a p-channel transistor means that the gate-source voltage $V_{gs}$ is higher than the threshold voltage $V_{th}$. For example, the off-state current of an n-channel transistor sometimes refers to a drain current that flows when the gate-source voltage $V_{gs}$ is lower than the threshold voltage $V_{th}$.

The off-state current of a transistor depends on $V_{gs}$ in some cases. Thus, "the off-state current of a transistor is lower than or equal to I" may mean there is $V_{gs}$ at which the off-state current of the transistor is lower than or equal to I. The off-state current of a transistor may refer to off-state current at a given $V_{gs}$, at $V_{gs}$ in a given range, or at $V_{gs}$ at which sufficiently low off-state current is obtained, for example.

As an example, the assumption is made of an n-channel transistor where the threshold voltage $V_{th}$ is 0.5 V and the drain current is $1\times10^{-9}$ A at $V_{gs}$ of 0.5 V, $1\times10^{-13}$ A at $V_{gs}$ of 0.1 V, $1\times10^{-19}$ A at $V_{gs}$ of −0.5 V, and $1\times10^{-22}$ A at $V_{gs}$ of −0.8 V. The drain current of the transistor is $1\times10^{-19}$ A or lower at $V_{gs}$ of −0.5 V or at $V_{gs}$ in the range of −0.5 V to −0.8 V; therefore, it can be said that the off-state current of the transistor is $1\times10^{-19}$ A or lower. Since there is $V_{gs}$ at which the drain current of the transistor is $1\times10^{-22}$ A or lower, it may be said that the off-state current of the transistor is $1\times10^{-22}$ A or lower.

In this specification and the like, the off-state current of a transistor with a channel width W is sometimes represented by a current value per channel width W or by a current value per given channel width (e.g., 1 μm). In the latter case, the off-state current may be represented by current per length (e.g., A/μm).

The off-state current of a transistor depends on temperature in some cases. Unless otherwise specified, the off-state current in this specification may be an off-state current at room temperature, 60° C., 85° C., 95° C., or 125° C. Alternatively, the off-state current may be an off-state current at a temperature at which the reliability of a semiconductor device or the like including the transistor is ensured or a temperature at which the semiconductor device or the like is used (e.g., temperature in the range of 5° C. to 35° C.). The state in which the off-state current of a transistor is I or lower may indicate that the off-state current of the transistor at room temperature, 60° C., 85° C., 95° C., 125° C., a temperature at which the reliability of a semiconductor device or the like including the transistor is ensured, or a temperature at which the semiconductor device or the like is used (e.g., a temperature in the range of 5° C. to 35° C.) is I or lower at a certain $V_{gs}$.

The off-state current of a transistor depends on voltage $V_{ds}$ between its drain and source in some cases. Unless otherwise specified, the off-state current in this specification may be an off-state current at $V_{ds}$ of 0.1 V, 0.8 V, 1 V, 1.2 V, 1.8 V, 2.5 V, 3 V, 3.3 V, 10 V, 12 V, 16 V, or 20 V. Alternatively, the off-state current may be an off-state current at $V_{ds}$ at which the reliability of a semiconductor device or the like including the transistor is ensured or $V_{ds}$ used in the semiconductor device or the like. The state in which the off-state current of a transistor is lower than or equal to I may indicate that the off-state current of the transistor at $V_{ds}$ of 0.1 V, 0.8 V, 1 V, 1.2 V, 1.8 V, 2.5 V, 3 V, 3.3 V, 10 V, 12 V, 16 V, or 20 V, at $V_{ds}$ at which the reliability of a semiconductor device or the like including the transistor is ensured, or at $V_{ds}$ used in the semiconductor device or the like is lower than or equal to I at a certain $V_{gs}$.

In the above description of off-state current, a drain may be replaced with a source. That is, the off-state current sometimes refers to a current that flows through a source of a transistor in the off state.

In this specification and the like, the term "leakage current" sometimes expresses the same meaning as off-state current. In this specification and the like, the off-state current sometimes refers to a current that flows between a source and a drain when a transistor is off, for example.

A voltage refers to a difference between potentials of two points, and a potential refers to electrostatic energy (electric potential energy) of a unit charge at a given point in an electrostatic field. Note that in general, a difference between a potential of one point and a reference potential (e.g., a ground potential) is simply called a potential or a voltage, and a potential and a voltage are used as synonymous words in many cases. Thus, in this specification, a potential may be rephrased as a voltage and a voltage may be rephrased as a potential unless otherwise specified.

(Embodiment 1)

A touch panel input method will be described in this embodiment with reference to FIGS. 1A and 1B, FIG. 2, FIGS. 3A and 3B, FIG. 4, FIGS. 5A and 5B, and FIG. 6.

FIG. 1A illustrates an electronic device 700. The electronic device 700 includes a housing 20 and a front panel 21. The front panel 21 includes a display panel 11, a plurality of touch sensors 13, a plurality of switches 14, a plurality of switches 15, a cover 16, a sensor 22, and a switch 23.

The details of the front panel 21 are described with reference to FIG. 1B. The front panel 21 includes the display panel 11. The display panel 11 has a display region 70. A touch panel 12 is positioned to overlap with the display panel 11. Although described here is an example in which the display panel 11 has four sides, the number of sides of the display panel 11 can be any number as long as it is greater than or equal to three. Furthermore, touch sensors 13[1] to 13[4] are provided on the front panel 21 along the sides of the display panel 11.

A switch 14[1] and a switch 15[1] are provided at both ends of the touch sensor 13[1]. The switch 14[1] and the switch 15[1] have the same function that is associated with the control of the touch sensor 13[1]. As with the above switches, switches 14[2] to 14[4] and switches 15[2] to 15[4] are provided at both ends of the touch sensors 13[2] to 13[4].

The touch sensors 13[1] and 13[2], for example, are positioned at different sides that are not parallel to each other and that are connected to each other at parts thereof. In other words, the touch sensors 13[1] and 13[2] are positioned at sides intersecting with each other. Thus, the switches 14[1] and 15[1] are positioned at both ends of the touch sensor 13[1], the switches 14[2] and 15[2] are positioned at both ends of the touch sensor 13[2], and the switches 14[1] and 15[2] are close to each other. Note that "the switches 14[1] and 15[2] are close to each other" here preferably means that the shortest distance between the switches 14[1] and 15[2] is shorter than or equal to 30 mm, further preferably shorter than or equal to 20 mm.

The sensor 22 has a function of detecting light from the outside and adjusting the luminance of the display region 70 depending on the light from the outside. The switch 23 has a function of turning on or off the electronic device 700. The switch 23 may have a plurality of functions. For example, the switch 23 may have a function of turning on or off the electronic device 700 when pressed for a predetermined time or longer, and a function of updating data of the display region 70 or starting up an application program when pressed for a short time or quickly pressed a plurality of times in a short time like double click. Operations other than those described above can be assigned as the functions of the switch 23.

Figure 1B:
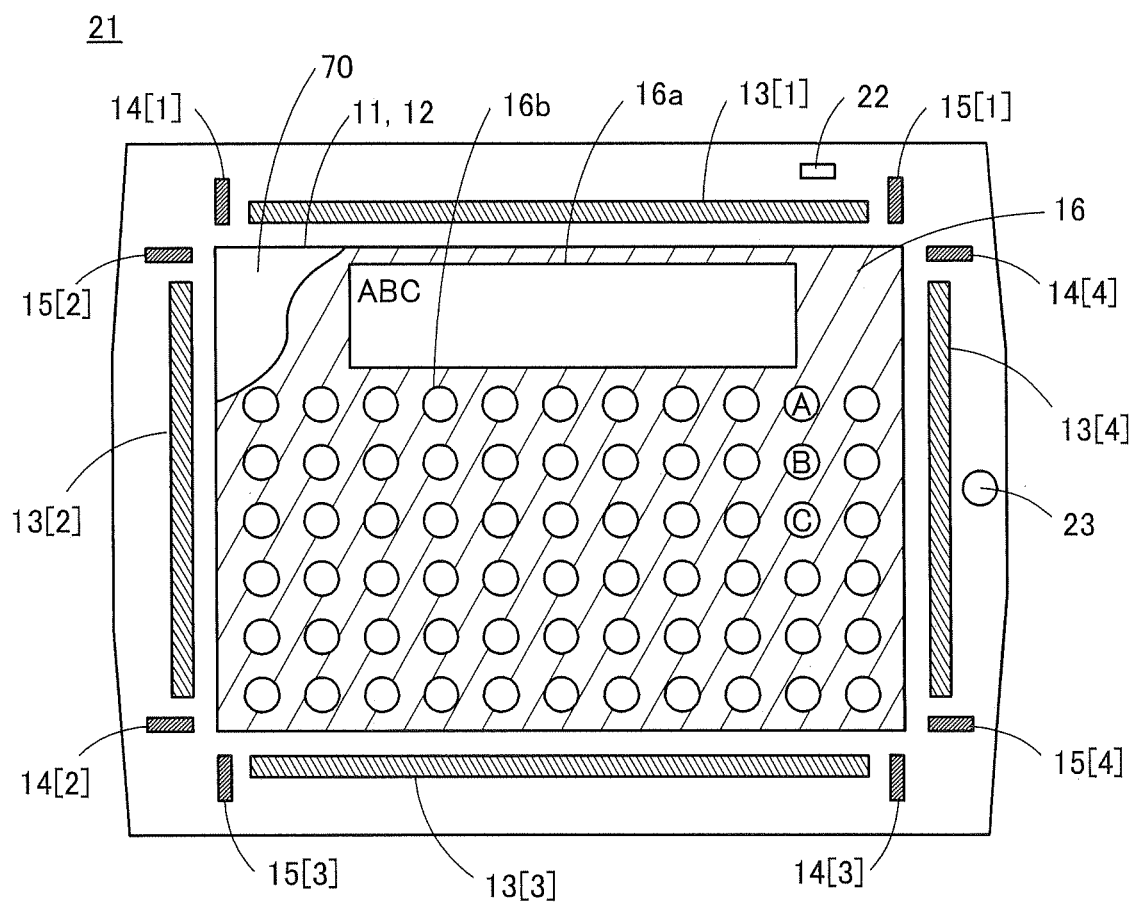

Although not illustrated in FIG. 1B, the front panel 21 may be provided with a solar cell that generates electric power from light from the outside in a region where electronic components such as the touch sensors 13[1] to 13[4], the switches 14[1] to 14[4], the switches 15[1] to 15[4], and the sensor 22 are not provided. The electric power generated by the solar cell can be used by the electronic components and the like.

A cover for preventing incorrect touch (hereinafter, described as the cover 16) is provided in a region overlapping with the display region 70. The cover 16 can prevent incorrect touch in a region covered by the cover even when people whose fingers involuntarily shake because of cerebral palsy or the like, elderly people who cannot move their arms, hands, or fingers sufficiently, or young children use the electronic device 700 to input data via the touch panel, for example. Thus, the operators can surely perform desired input easily. The cover preferably has an opening region 16a and a plurality of opening regions 16b, for example.

In the case of inputting texts, for example, the display region 70 can display letters in regions overlapping with the opening regions 16b. An operator touches the touch panel 12 at a position overlapping with any of the opening regions 16b to select a display object of a desired letter. Owing to a control program in the electronic device 700, a display object that is displayed at a position where touch is detected can be recognized via a processor. Thus, the control program can determine the kind of the letter associated with the display object.

The determined letter can be displayed in the opening region 16a. FIG. 1B illustrates an example in which display objects "A," "B," and "C" are shown in the opening regions 16b. When the operator touches "A," "B," and "C" in this order, "A," "B," and "C" are preferably displayed in the opening region 16a.

The opening region 16a is larger than each of the opening regions 16b, and the operator can perform touch operation freely. For example, the input text can be corrected by touch operation. Furthermore, when a display object associated with an application program (hereinafter, described as an icon) or the like displayed in the opening region 16a is touched, the application program can be started up.

FIG. 1B illustrates an example in which the touch sensors 13[1] to 13[4] are provided on the front panel 21. The touch sensors 13[1] to 13[4] are not necessarily provided on the front panel 21, and the touch sensors 13[1] to 13[4] as well as the touch panel 12 may be provided over the display panel 11. Alternatively, the touch panel 12 and the touch sensors 13[1] to 13[4] may be formed as one touch panel, which has different functions depending on regions. Further alternatively, the touch panel 12 and the touch sensors 13[1] to 13[4] may be formed as a plurality of touch sensors over the display panel 11 and controlled independently.

Figure 2:
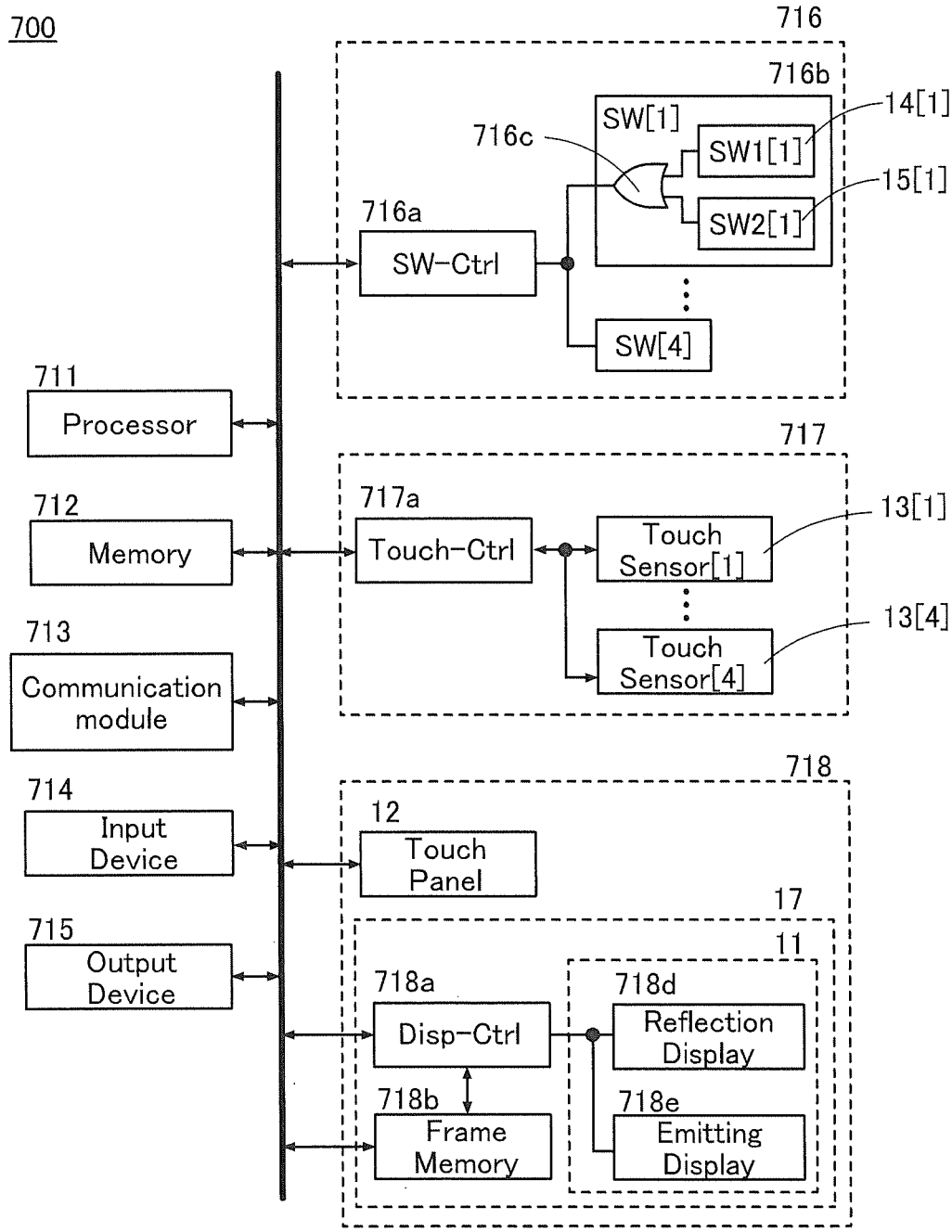
FIG. 2 is a block diagram illustrating an electronic device.

FIG. 2 illustrates the configuration of the electronic device 700 illustrated in FIGS. 1A and 1B. The electronic device 700 includes a processor 711, a memory device 712, a communication module 713, an input device 714, an output device 715, a switch module 716, a touch sensor module 717, and a display module 718.

The switch module 716 includes a switch control portion 716a and a plurality of switches 716b. The switches 716b include logic circuits 716c, the switches 14, and the switches 15. FIG. 1B illustrates an example in which two switches, the switches 14[1] and 15[1], are provided for the touch sensor 13[1]. The number of the switches can be set as appropriate. The maximum number of the switches is n, where n is an integer greater than or equal to 1.

Each of the logic circuits 716c functions as an OR circuit. Accordingly, a selection signal is transmitted to the switch control portion 716a when one of the switches 14[1] and 15[1] is selected. Although it is preferable to use an OR circuit as each of the logic circuits 716c, an AND circuit may be used. In the case of using an AND circuit, a selection signal is transmitted to the switch control portion 716a when both of the two switches described as examples, the switches 14[1] and 15[1], are selected.

The switches 14 and 15 are preferably push button switches, for example; optical switches, touch sensors, thermal sensors, infrared ray sensors, or the like can also be used. Alternatively, electronic components having a function of detecting a change in the state by electrical connection or disconnection like a relay switch may be used.

The touch sensor module 717 includes a touch control portion 717a and the touch sensors 13[1] to 13[4]. Although FIG. 1B illustrates an example in which the touch control portion 717a controls the touch detection of the touch sensors 13[1] to 13[4], the touch control portion 717a may be provided for each of the touch sensors 13[1] to 13[4].

The display module 718 includes a display device 17 and the touch panel 12. The display device 17 includes a display controller 718a, a frame memory 718b, and the display panel 11. The display panel 11 has the display region 70. The display region 70 has a display portion 718d including a reflective display element and a display portion 718e including a light-emitting display element. Although the display panel 11 described here as an example includes two display portions, the display panel 11 having one of the display portions may be employed. A display portion including a transmissive display element may be included. The details of the display panel 11 will be described in Embodiment 2 and later embodiments. The details of a transistor included in the display panel 11 will be described in Embodiment 5.

Examples of the input device 714 include a sensor (having a function of measuring or detecting force, displacement, position, speed, acceleration, angular velocity, rotational frequency, distance, light, liquid, magnetism, temperature, a chemical substance, sound, time, hardness, an electric field, current, voltage, electric power, radiation, flow rate, humidity, gradient, oscillation, smell, or infrared rays), a joystick, a keyboard, a hardware button, a pointing device, an imaging device, an audio input device, an eye-gaze input device, an orientation determination device, and a solar cell.

Examples of the output device 715 include an external memory device and an external display device.

The memory device 712 retains a control program, an application program, and data. The control program or the application program can use the memory device 712, the communication module 713, the input device 714, the output device 715, the touch sensor module 717, and the display module 718 via the processor. The memory device 712 can retain data even after the electronic device 700 is powered off. The time it takes to start up the program when the electronic device 700 is powered on again can be shortened.

The memory device 712 or the frame memory 718b included in the display module 718 is desirably an internal memory (e.g., a nonvolatile memory, a static random access memory (SRAM), a dynamic random access memory (DRAM), a NOSRAM, or a DOSRAM) or an inserted external nonvolatile memory. Alternatively, the memory device 712 or the frame memory 718b may be a work memory (e.g., a nonvolatile memory, an SRAM, a DRAM, a NOSRAM, or a DOSRAM) that temporarily retains data or a program downloaded with a communication module.

An electrically erasable and programmable read only memory (EEPROM) or a flash memory, which is a nonvolatile memory, retains data by storing electric charges in what is called a floating gate provided between a channel and a gate. However, in a conventional EEPROM or flash memory, high voltage is needed at the time of injection of charges to the floating gate or removal of charges. Because of this, deterioration of a gate insulating film cannot be avoided and it is not possible to limitlessly repeat write and erase operations.

A NOSRAM and a DOSRAM each have a memory configuration capable of retaining data even when power supply is stopped, owing to a transistor whose semiconductor layer contains a metal oxide that is known to enable a transistor to have low off-state current. The transistor used in a NOSRAM or a DOSRAM will be described in detail in Embodiment 5.

Figure 3A:
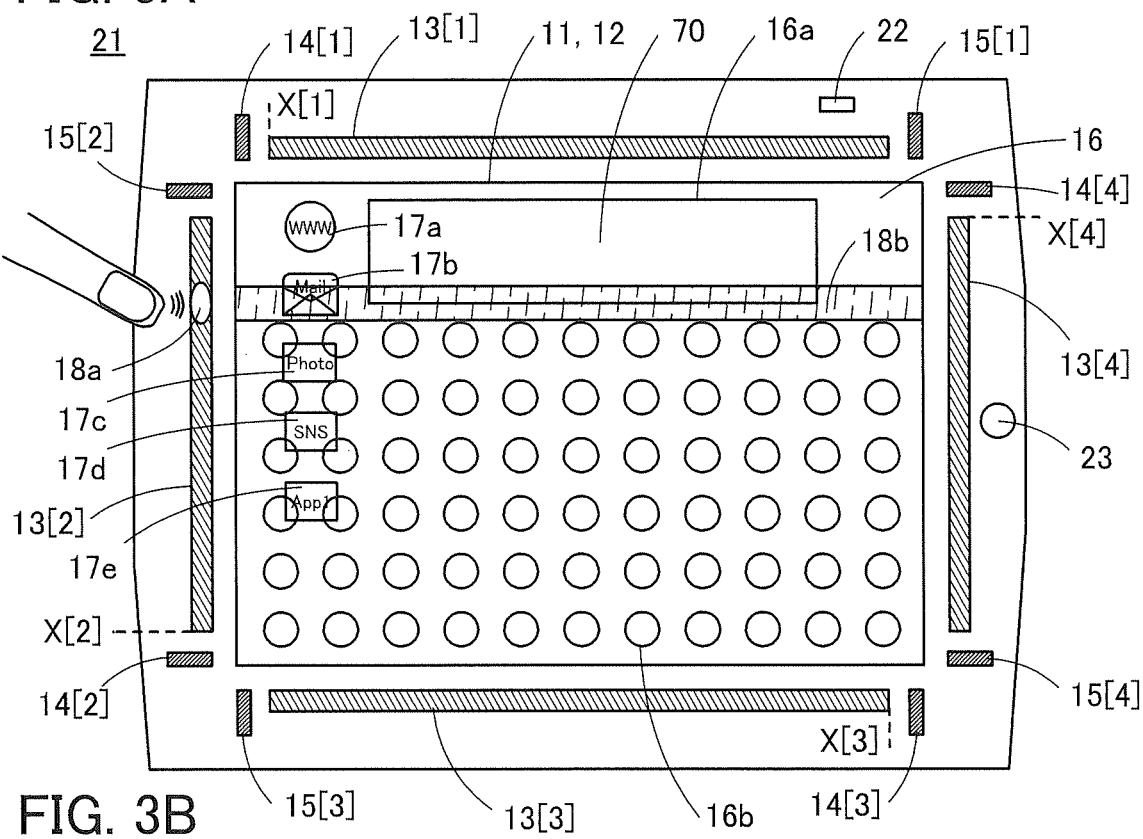
FIGS. 3A and 3B each illustrate a structure of an electronic device.

FIG. 3A illustrates an example where a plurality of icons are displayed in the display region 70. Unlike in the case of inputting texts as illustrated in FIG. 1B, display objects such as icons are not positioned in the regions overlapping with the opening regions 16b, in some cases.

In some cases, an icon or, on a display screen while an application program is running, a menu screen, a display object such as a selection button, or the like is displayed. For example, an icon or a display object the operator wants to select might be positioned under the cover 16 as illustrated in FIG. 3A. Thus, in the case of the electronic device 700 provided with the cover 16, a display object such as an icon is not easily selected by touch because the display object does not overlap with the opening regions 16b.

Figure 3B:
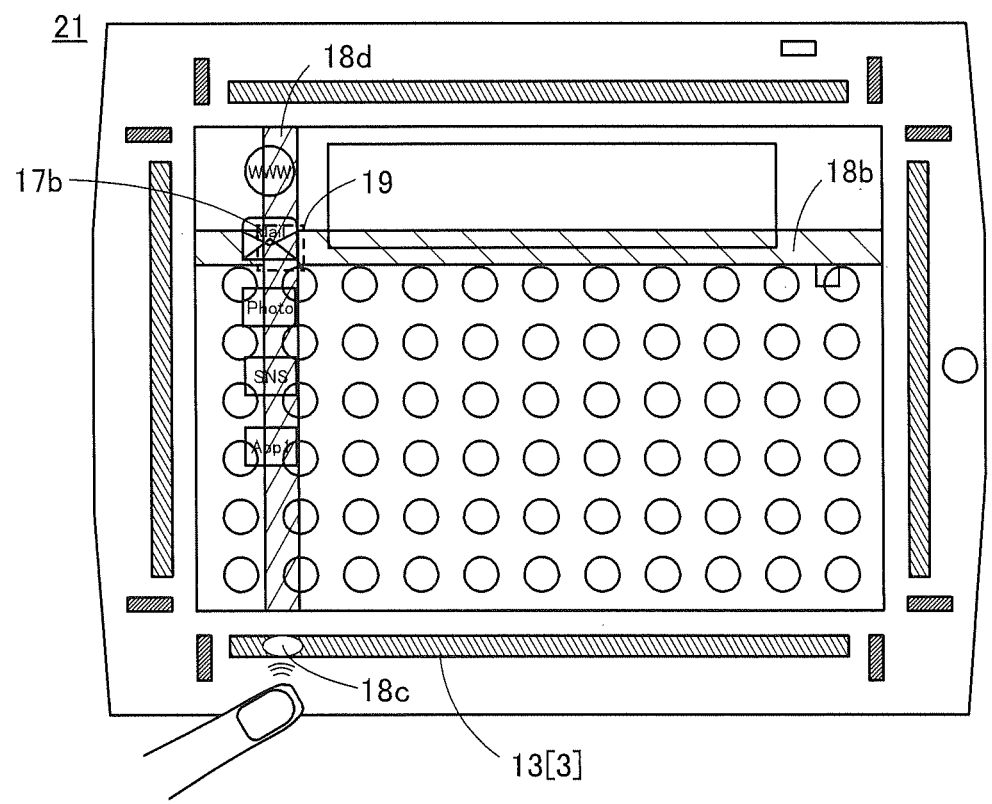

FIGS. 3A and 3B illustrate an example of a method for selecting an icon that is positioned under the cover 16 and thus is hard to touch.

FIG. 3A illustrates an example in which icons 17a to 17e are displayed in the display region 70. To select the icon 17b for booting up, the operator touches the touch sensor 13[2] first. Accordingly, touch on the touch sensor 13[2] can be detected by the touch control portion 717a. The control program in the electronic device 700 can receive a touch coordinate 18a detected by the touch control portion 717a from the touch control portion 717a via the processor 711.

By the control program, the touch coordinate 18a can be supplied to the display module 718 via the processor 711. Thus, a selected region 18b selected using the touch coordinate 18a can be displayed in the display region 70. The selected region 18b extends in the direction perpendicular to a long side of the touch sensor 13[2] from the touch coordinate 18a. In FIG. 3A, the Y coordinate of the position where the target icon 17b is displayed is extracted.

To deselect the selected region, the operator touches either of the switches 14[2] and 15[2] positioned at both ends of the touch sensor 13[2]. The switches 14[2] and 15[2] are preferably positioned to be easily used by the operator by the dominant hand. The number of the switches can be changed depending on the size of the electronic device 700.

The touch coordinate 18a is preferably a plurality of coordinates. The width of the selected region 18b can be, for example, the difference between the maximum coordinate and the minimum coordinate in the major-axis direction of the touch sensor 13[2]. Note that the end of the touch sensor 13[2] on the side closer to the switch 14[2] can be used as an origin X[2]. Alternatively, the width can be designated by the operator or the control program using the midpoint of the width detected by touch as the reference point. It is preferable to select a width appropriate for the size of the display object such as an icon.

The gray level of display in the selected region can be changed. The gray level may be changed by being multiplied by a designated coefficient or added with a designated gray level. Alternatively, color tone may be changed. To change the color tone, for example, the gray level of display obtained by an additive color mixing method using red (R), green (G), and blue (B) (hereinafter referred to as RGB) is changed by increasing or decreasing the gray level of at least one color.

Alternatively, the color tone may be changed by adding the fourth color to the gray level of display represented by RGB. The fourth color may be one or more of RGB, or one or more of cyan, magenta, and yellow. Further alternatively, the color tone may be changed by adding white.

In FIG. 3B, the X coordinate of the position where the target icon 17b is displayed is selected. The operator touches the touch sensor 13[3]. Accordingly, touch on the touch sensor 13[3] can be detected by the touch control portion 717a. The control program can receive a touch coordinate 18c detected by the touch control portion 717a from the touch control portion 717a via the processor 711.

By the control program, the touch coordinate 18c can be supplied to the display module 718 via the processor 711. Thus, a selected region 18d selected using the touch coordinate 18c can be displayed in the display region 70. The selected region 18*d* extends in the direction perpendicular to a long side of the touch sensor 13[3]. Accordingly, a selected region 19 can be selected in the display region 70 using the touch coordinate 18*a* and the touch coordinate 18*c*.

To deselect the selected region on the selected side, the operator touches either of the switches 14[2] and 15[2] positioned at both ends of the touch sensor 13[2]. To deselect the selected region on the different side, the operator touches either of the switches 14[3] and 15[3] positioned at both ends of the touch sensor 13[3]. When either of the selected regions is deselected, the selected region 19 is also deselected. The period during which any of the switches 14 and 15 that are used to deselect a selected region is pressed is preferably set and managed to prevent incorrect touch.

In such a manner, the icon 17*b* displayed in a region overlapping with the selected region 19 can be selected using the touch sensor 13[2] and the touch sensor 13[3]. It is preferable that, for example, the gray level or the color tone of the icon 17*b* be changed, the icon 17*b* be blinked, or the outline of the icon 17*b* be blinked so that the operator can recognize that the icon 17*b* in the selected region 19 is selected.

A command for executing an application program associated with the icon 17*b* can be generated by any of a variety of methods. For example, an application program associated with the selected icon is executed by pressing the switch 23. Alternatively, the application program may be executed by pressing two switches, the switches 14[2] and 15[3], at the same time. Further alternatively, the application program may be executed when the touch panel 12 is touched through any of the opening regions 16*a* and 16*b* while the selected region 19 is selected.

The pair of the switches 14[1] and 15[1], the pair of the switches 14[2] and 15[2], the pair of the switches 14[3] and 15[3], and the pair of the switches 14[4] and 15[4] each function as one switch. Thus, the combination of the switches 14[2] and 15[3] may provide a function other than the deselecting function.

FIGS. 3A and 3B illustrate an example in which the touch sensors 13[1] and 13[3] have the same function and the touch sensors 13[2] and 13[4] have the same function. When any of the touch sensors detects touch, the icon or the like displayed under the cover can be selected. It is preferable that the operator enable or disable each of the touch sensors. It is also preferable that the operator enable or disable each of the switches 14 and 15.

Figure 4:
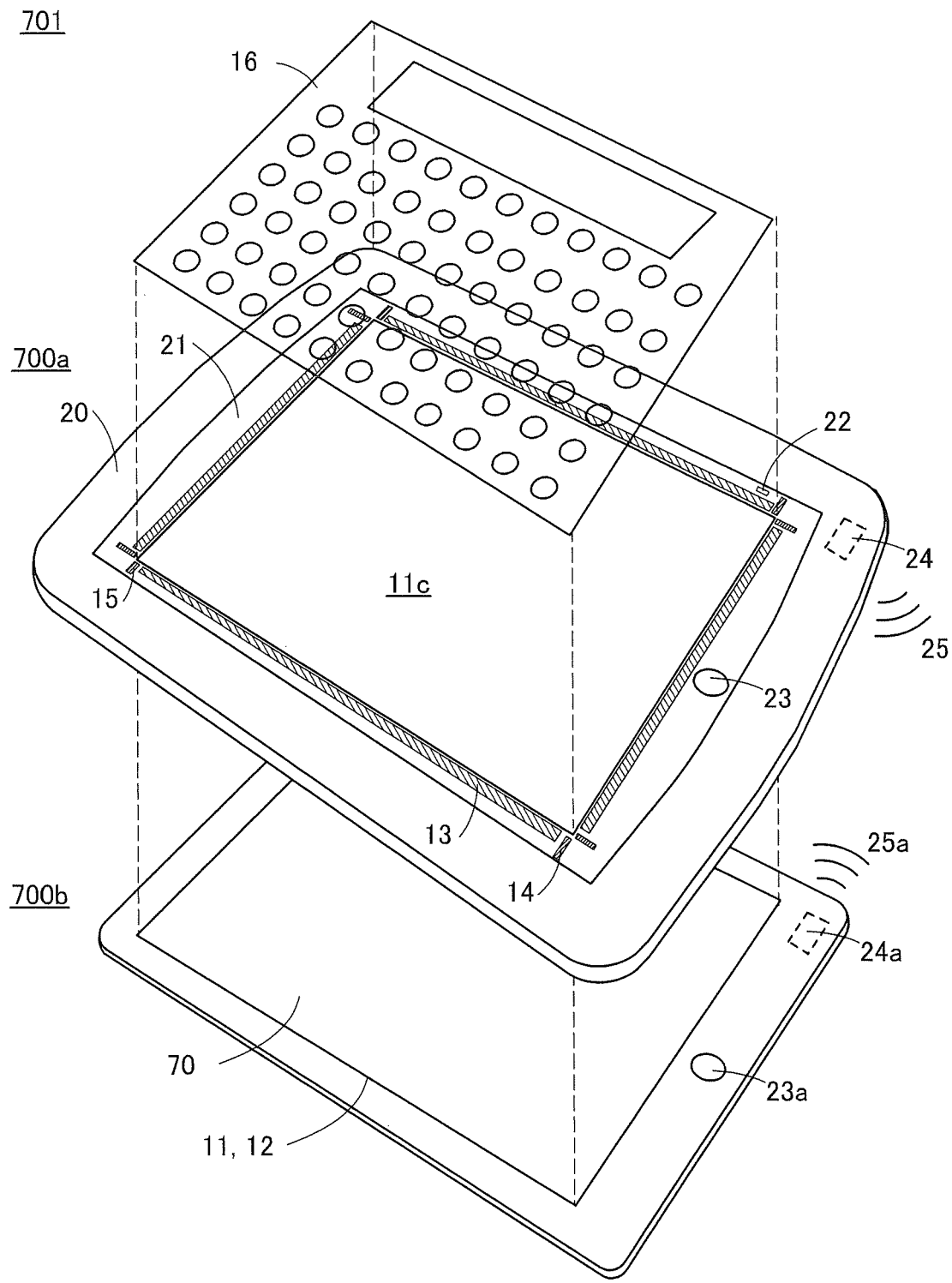
FIG. 4 illustrates a structure of an electronic device.

An electronic device 701 illustrated in FIG. 4 has a structure that differs from that of the electronic device 700 in FIGS. 1A and 1B. The electronic device 701 includes an electronic device 700*a*, an electronic device 700*b*, and the cover 16. The electronic device 700*a* includes the housing 20 and the front panel 21. The front panel 21 includes the touch sensors 13, the switches 14, the switches 15, the sensor 22, and the switch 23. The housing 20 includes a communication module 24. As the electronic device 700*b*, an electronic device such as a tablet, a smartphone, or a notebook personal computer can be used.

The electronic device 700*a* has a function of storing the electronic device 700*b* in the housing 20. The front panel 21 has an opening region 11*c* through which display in the display region 70 can be seen. The cover 16 is provided to overlap with the opening region 11*c*. The cover 16 has a function of being attached or detached by an operator.

The electronic device 700*b* includes the display module 718 and a communication module 24*a*. The display module 718 includes the display device 17 and the touch panel 12. The display device 17 includes the display panel 11. The touch panel 12 is provided to overlap with the display panel 11.

The switch 23 included in the electronic device 700*a* and a switch 23*a* included in the electronic device 700*b* stored in the electronic device 700*a* preferably overlap with each other. If the switch 23 and the switch 23*a* do not overlap with each other, it is preferable to employ a mechanism in which the switch 23*a* of the electronic device 700*b* is pressed when the switch 23 of the electronic device 700*a* is pressed. Alternatively, a command detected by the switch 23 may be sent via the communication module.

The display region 70 of the electronic device 700*b* stored in the electronic device 700*a* is provided to overlap with the opening region 11*c* of the electronic device 700*a*. The communication module 24 included in the electronic device 700*a* and the communication module 24*a* included in the electronic device 700*b* can transmit data wirelessly by utilizing carrier waves. Accordingly, in the electronic device 700*b* stored in the electronic device 700*a* illustrated in FIG. 4, as with FIGS. 1A and 1B, a selected region can be displayed on the display portion of the electronic device 700*b* by touching the touch sensor 13.

The communication modules 24 and 24*a* can transmit and receive operation data, sensor data, a program, and the like by utilizing carrier waves 25 and 25*a*. The communication modules 24 and 24*a* can use a communication standard developed by IEEE such as a wireless local area network (LAN), Wi-Fi (registered trademark), Bluetooth (registered trademark), or ZigBee (registered trademark).

Figure 5A:
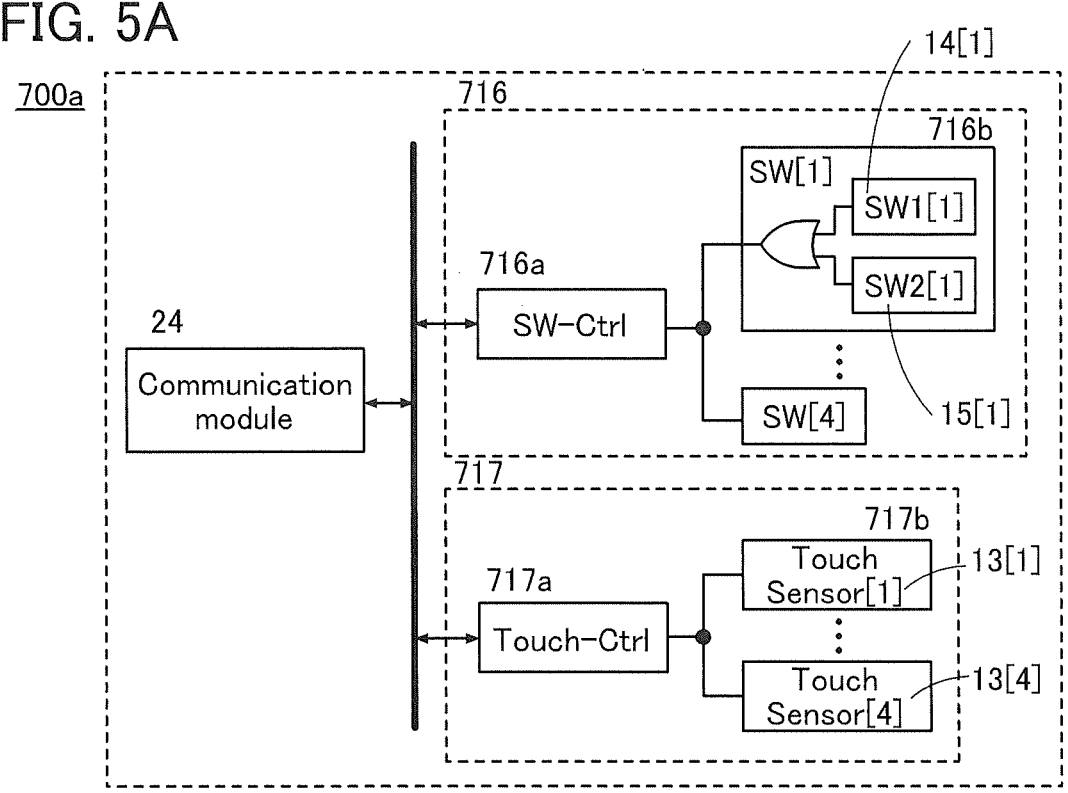
FIGS. 5A and 5B are block diagrams each illustrating an electronic device.
Figure 5B:
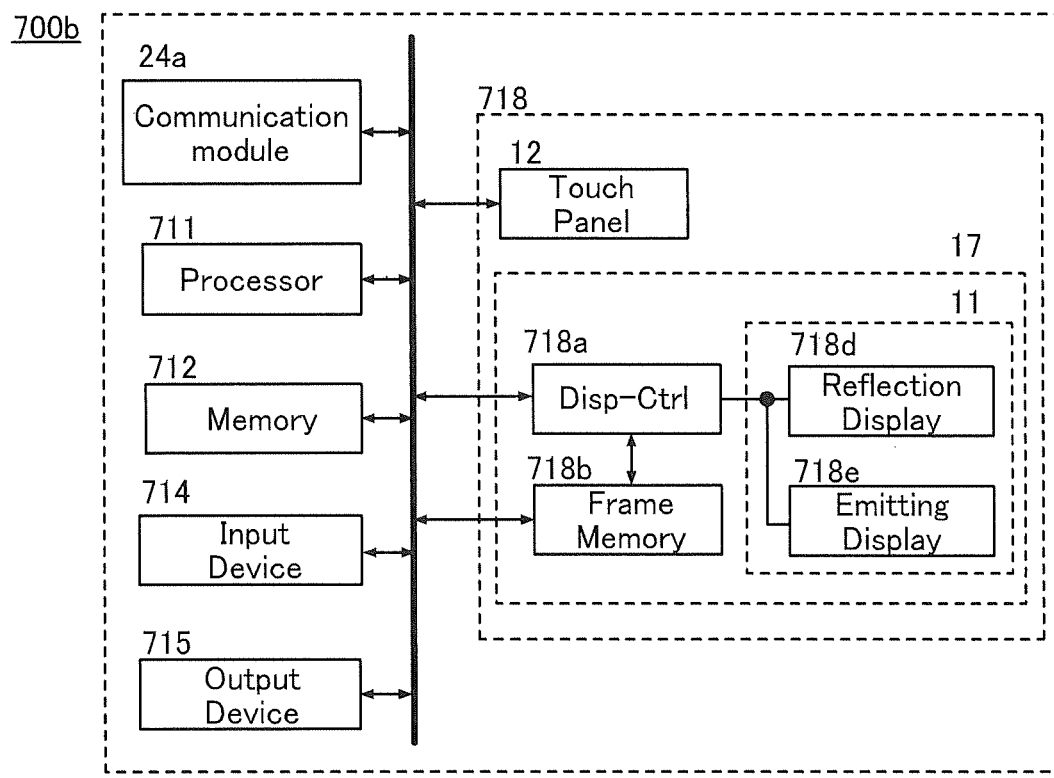

FIGS. 5A and 5B illustrate the configurations of the electronic devices 700*a* and 700*b* in FIG. 4. Unlike the electronic device 700 in FIG. 1A, the electronic device 700*a* in FIG. 5A and the electronic device 700*b* in FIG. 5B are separately provided.

The electronic device 700*a* illustrated in FIG. 5A includes the communication module 24, the switch module 716, and the touch sensor module 717. The electronic device 700*b* illustrated in FIG. 5B includes the processor 711, the memory device 712, the communication module 24*a*, the input device 714, the output device 715, and the display module 718. The switch 23*a* is preferably included in the input device 714.

When the electronic device 700*a* employs the touch input method described with reference to FIGS. 1A and 1B, FIG. 2, and FIGS. 3A and 3B, detection information from the touch sensors 13 and the switches 14 and 15 is supplied to the electronic device 700*b* via the communication module 24. In the electronic device 700*b*, the detection information from the touch sensors 13 and the switches 14 and 15 supplied via the communication module 24*a* is supplied to the display module 718 via the processor 711. The detection information from the electronic device 700*a* may be supplied to the display module 718 in the electronic device 700*b* without via the processor 711.

The electronic device 700*b* can select or deselect the selected regions 18*b* and 18*d* depending on the detection information. Thus, by a control program in the electronic device 700*b*, the selected region 19 can be selected and an application program associated with an icon or the like displayed in the display region 70 can be started up.

When the housing 20 has a different shape, the electronic device can be used for a stationary input device, an ATM for financial institutions, a ticket machine, a vending machine for selling products, or the like. When the electronic device has a function of preventing the entry of dust or water, the electronic device can be used for an electronic device used outdoors, an electronic device used in water, an electronic device used in space, or the like.

Figure 6:
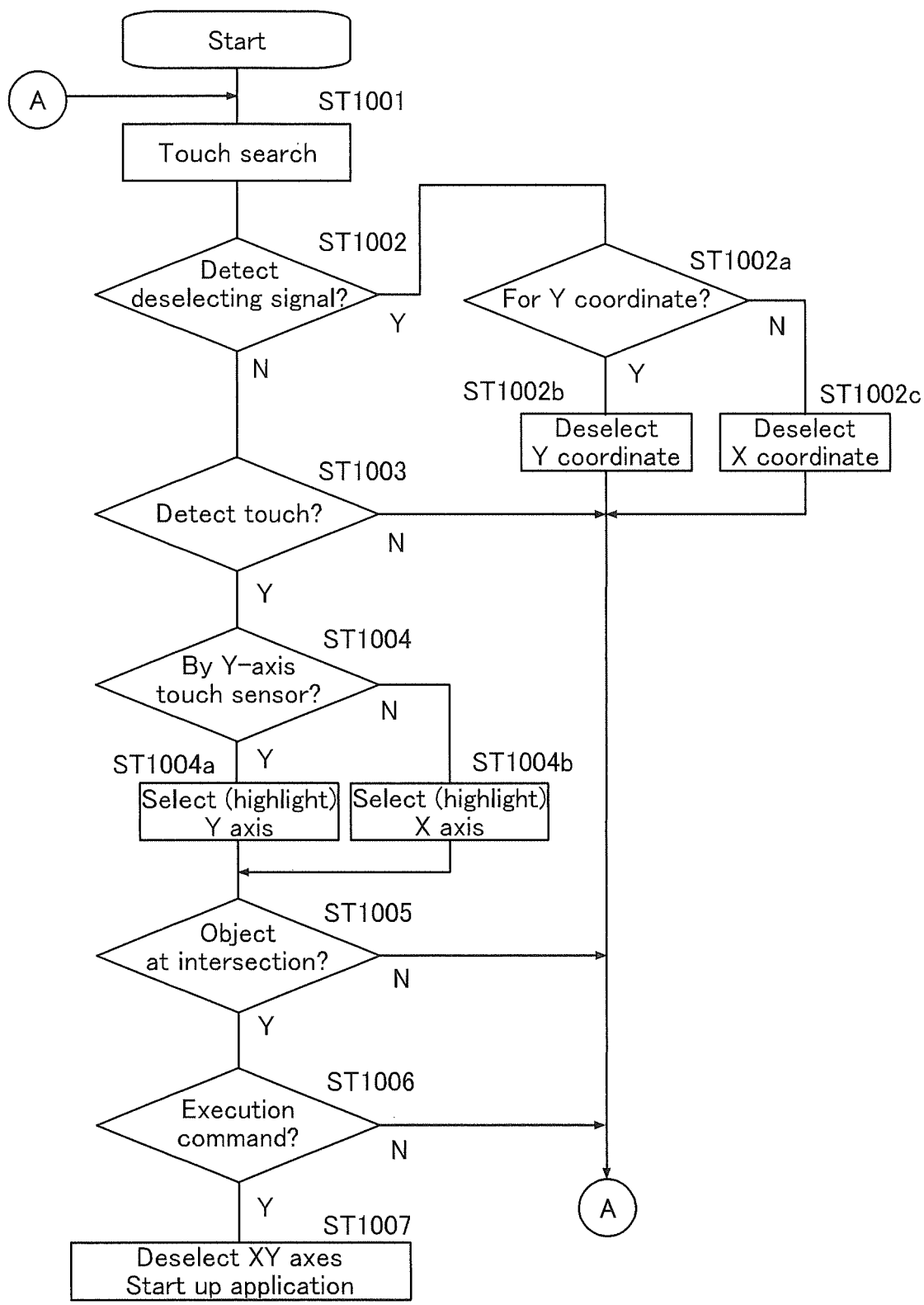
FIG. 6 is a flow chart illustrating an operation of an electronic device.

The touch panel input method will be described using a flow chart in FIG. 6.

ST1001 is a step of searching the detection of touch in any of the touch sensors 13[1] to 13[4] provided on the front panel.

ST1002 is a step of detecting a deselecting signal obtained when any of the switches 14 and 15 is pressed. When the deselecting signal is detected, the operation proceeds to ST1002*a*. When the deselecting signal is not detected, the operation proceeds to ST1003.

ST1002*a* is a step of determining whether the deselecting signal obtained when any of the switches 14 and 15 is pressed is for the touch sensor detecting the touch coordinate in the Y-axis direction. If the pressed switch 14 or 15 is a switch provided for the touch sensor detecting the touch coordinate in the Y-axis direction, the operation proceeds to ST1002*b*. If the pressed switch 14 or 15 is a switch provided for the touch sensor detecting the touch coordinate in the X-axis direction, the operation proceeds to ST1002*c*.

ST1002*b* is a step of deselecting the touch coordinate in the Y-axis direction. After the touch coordinate in the Y-axis direction is deselected, the operation proceeds to ST1001. In the case where the touch coordinate in the X-axis direction and the touch coordinate in the Y-axis direction are selected so that the selected region 19 is selected, the selected region 19 is deselected when the touch coordinate in the Y-axis direction is deselected.

ST1002*c* is a step of deselecting the touch coordinate in the X-axis direction. After the touch coordinate in the X-axis direction is deselected, the operation proceeds to ST1001. In the case where the touch coordinate in the X-axis direction and the touch coordinate in the Y-axis direction are selected so that the selected region 19 is selected, the selected region 19 is deselected when the touch coordinate in the X-axis direction is deselected.

ST1003 is a step of determining whether any of the touch sensors 13 detects touch. If it is determined that touch is not detected, the operation proceeds to ST1001. If it is determined that touch is detected, the operation proceeds to ST1004.

ST1004 is a step of determining whether the touch is detected by the touch sensor extending in the Y-axis direction. If the touch is detected by the touch sensor 13[2] or 13[4] extending in the Y-axis direction, the operation proceeds to ST1004*a*. If the touch is detected by the touch sensor 13[1] or 13[3] in the X-axis direction, the operation proceeds to ST1004*b*.

ST1004*a* is a step of obtaining the touch coordinate where the touch is detected from the touch sensor 13[2] or 13[4] extending in the Y-axis direction. As the touch coordinate, the maximum coordinate and the minimum coordinate from the origin X[2] or an origin X[4] are preferably obtained.

ST1004*b* is a step of obtaining the touch coordinate where the touch is detected from the touch sensor 13[1] or 13[3] extending in the X-axis direction. As the touch coordinate, the maximum coordinate and the minimum coordinate from the origin X[1] or an origin X[3] are preferably obtained.

ST1005 is a step of determining whether the selected region 19 at a position where the X axis and the Y axis intersect with each other is selected. If the selected region 19 is selected, the operation proceeds to ST1006. If the selected region 19 is not selected, the operation proceeds to ST1001. The processor 711 determines whether there is a display object such as an icon in a region overlapping with the selected region 19. If there is no display object, the operation proceeds to ST1001.

ST1006 is a step of determining whether an execution command is received. In that case, it is preferable that, for example, the gray level or the color tone of the icon be changed, the icon be blinked, or the outline of the icon be blinked so that the operator can recognize that the icon in the selected region 19 is selected. If an execution command is received, the operation proceeds to ST1007. If an execution command is not received, the operation proceeds to ST1001. In the case where the operator wants to select a different display object, the operation proceeds to ST1001.

ST1007 is a step performed when a display object is positioned in the region overlapping with the selected region 19 and an execution command is received. The processor 711 deselects the selected region 18*b* extending in the Y-axis direction, the selected region 18*d* extending in the X-axis direction, and the selected region 19, and starts up an application program.

With the use of the above touch input method, an application program can be executed or operation can be performed even when the cover 16 is provided over the touch panel 12. Alternatively, an application program can be executed or operation can be performed even in an electronic device not having the touch panel 12. Furthermore, a display object at an unspecified position in an application program can be selected and executed. In addition, a novel touch input method can be provided with which an electronic device the display device 17 of which does not include a touch panel can be operated as in the case of including a touch panel. Moreover, an electronic device with improved operability can be provided.

(Embodiment 2)

In this embodiment, an example where a hybrid display device is applied to the display device in Embodiment 1 will be described.

In this specification, hybrid display refers to a method for displaying text or an image, in which reflected light and self-emitted light are used together in one panel to complement each other's color tone or light intensity. Alternatively, hybrid display refers to a method for displaying text or an image with the use of light from a plurality of display elements in one pixel or one subpixel. Note that a hybrid display device performing hybrid display may locally include a pixel or a subpixel performing display using one of a plurality of display elements and a pixel or a subpixel performing display using two or more of the plurality of display elements.

In this specification and the like, hybrid display satisfies at least one of the above descriptions.

Furthermore, a hybrid display device includes a plurality of display elements in one pixel or one subpixel. As an example of the plurality of display elements, a reflective element that reflects light and a self-luminous element that emits light can be given. Note that the reflective element and the self-luminous element can be controlled independently. The hybrid display device has a function of displaying text or an image on a display portion with the use of reflected light or self-emitted light.

The display device of one embodiment of the present invention can include a pixel provided with a first display element that reflects visible light, a pixel provided with a second display element that emits visible light, or a pixel provided with the first display element and the second display element.

In this embodiment, a display device including the first display element that reflects visible light and the second display element that emits visible light will be described.

The display device has a function of displaying an image by utilizing first light reflected from the first display element and/or second light emitted from the second display element. Alternatively, the display device has a function of expressing gray scales by individually controlling the amount of the first light reflected from the first display element and the amount of the second light emitted from the second display element.

The display device preferably includes a first pixel that expresses gray scales by controlling the amount of light reflected from the first display element and a second pixel that expresses gray scales by controlling the amount of light emitted from the second display element. For example, the first pixels and the second pixels are arranged in a matrix to form a display portion.

It is preferable that the first pixels and the second pixels be the same in number and be arranged with the same pitch in a display region. Here, the adjacent first and second pixels can be collectively referred to as a pixel unit. Accordingly, as described later, an image displayed by only a plurality of first pixels, an image displayed by only a plurality of second pixels, and an image displayed by both the plurality of first pixels and the plurality of second pixels can be displayed in the same display region.

As the first display element included in the first pixel, an element that performs display by reflecting external light can be used. Such an element does not include a light source, and thus, the power consumption for display can be significantly reduced.

As the first display element, typically, a reflective liquid crystal element can be used. Alternatively, as the first display element, a microelectromechanical systems (MEMS) shutter element; an optical interference type MEMS element; an element to which a microcapsule method, an electrophoretic method, an electrowetting method, an Electronic Liquid Powder (registered trademark) method, or the like is applied; or the like can be used.

As the second display element included in the second pixel, an element that performs display by utilizing light from its own light source can be used. Specifically, it is preferable to use an electroluminescent element in which light emission can be extracted from a light-emitting substance by application of an electric field. Since the luminance and chromaticity of light emitted from such a pixel are not affected by external light, an image with high color reproducibility (wide color gamut) and high contrast, i.e., a clear image, can be displayed.

As the second display element, for example, a self-luminous light-emitting element such as an organic light-emitting diode (OLED), a light-emitting diode (LED), a quantum-dot light-emitting diode (QLED), or a semiconductor laser can be used. Alternatively, a combination of a backlight that serves as a light source and a transmissive liquid crystal element that controls the amount of light from the backlight transmitted therethrough may be used as the display element included in the second pixel.

The first pixel can include, for example, a subpixel exhibiting white (W) or subpixels exhibiting light of three colors of red (R), green (G), and blue (B). Similarly, the second pixel can include, for example, a subpixel exhibiting white (W) or subpixels exhibiting light of three colors of red (R), green (G), and blue (B). Note that the first pixel and the second pixel may each include subpixels of four or more colors. As the number of kinds of subpixels is increased, the power consumption can be reduced and the color reproducibility can be improved.

In one embodiment of the present invention, the display mode can be switched between a first mode in which an image is displayed by the first pixels, a second mode in which an image is displayed by the second pixels, and a third mode in which an image is displayed by the first pixels and the second pixels. It is also possible to input different image signals to the first pixels and the second pixels to display a composite image.

In the first mode, an image is displayed using light reflected from the first display element. The first mode, which requires no light source, is a driving mode with extremely low power consumption. For example, the first mode is effective in the case where external light is white or near-white light with sufficiently high illuminance. The first mode is suitably used for displaying text information of a book, a document or the like. The use of reflected light enables eye-friendly display, thereby mitigating eye strain.

In the second mode, an image is displayed utilizing light emitted from the second display element. Thus, an extremely clear image (with high contrast and high color reproducibility) can be displayed regardless of the illuminance and chromaticity of external light. For example, the second mode is effective when the illuminance of external light is extremely low, e.g., during the night or in a dark room. When a bright image is displayed under weak external light, a user may feel that the image is too bright. To prevent this, an image with reduced luminance is preferably displayed in the second mode. Thus, excessive brightness can be suppressed, and the power consumption can be reduced. The second mode is suitably used for displaying a clear image, a smooth moving image, or the like.

In the third mode, display is performed utilizing both light reflected from the first display element and light emitted from the second display element.

Specifically, in this driving mode, light from the first pixel and light from the second pixel adjacent to the first pixel are mixed to express one color. An image can be displayed more clearly than in the first mode, and the power consumption can be lower than that in the second mode. For example, the third mode is effective when the illuminance of external light is relatively low, e.g., under indoor illumination or in the morning or evening, or when the external light does not represent a white chromaticity.

A more specific example of one embodiment of the present invention will be described below with reference to drawings.

[Structure Example of Display Device]

Figure 7:
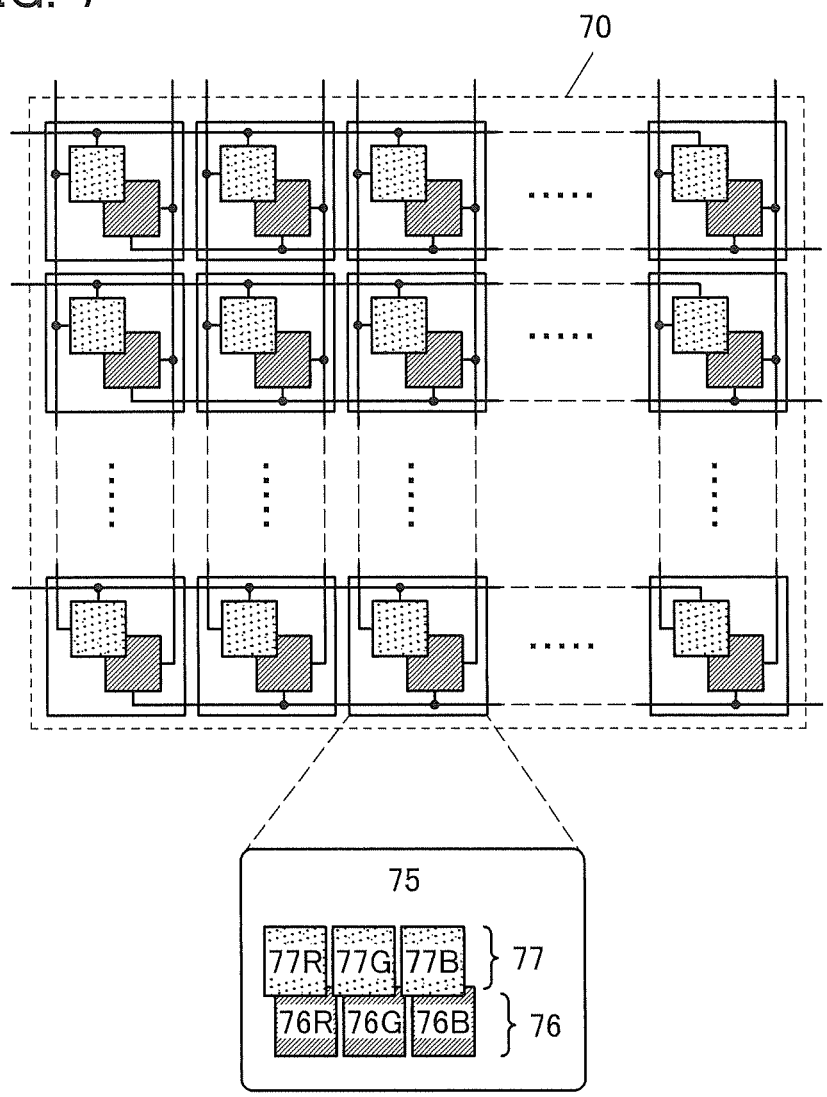
FIG. 7 illustrates a pixel unit.

FIG. 7 illustrates the display region 70 included in the display device of one embodiment of the present invention. The display region 70 includes the plurality of pixel units 75 arranged in a matrix. Each of the pixel units 75 includes a pixel 76 and a pixel 77.

FIG. 7 illustrates an example in which the pixel 76 and the pixel 77 each include display elements corresponding to three colors of red (R), green (G), and blue (B).

The pixel 76 includes a display element 76R corresponding to red (R), a display element 76G corresponding to green (G), and a display element 76B corresponding to blue (B). The display elements 76R, 76G, and 76B are each the second display element that utilizes light from a light source.

The pixel 77 includes a display element 77R corresponding to red (R), a display element 77G corresponding to green (G), and a display element 77B corresponding to blue (B).

The display elements 77R, 77G, and 77B are each the first display element that utilizes reflection of external light.

The above is the description of the structure example of the display device.

[Structure Example of Pixel Unit]

Figure 8A:
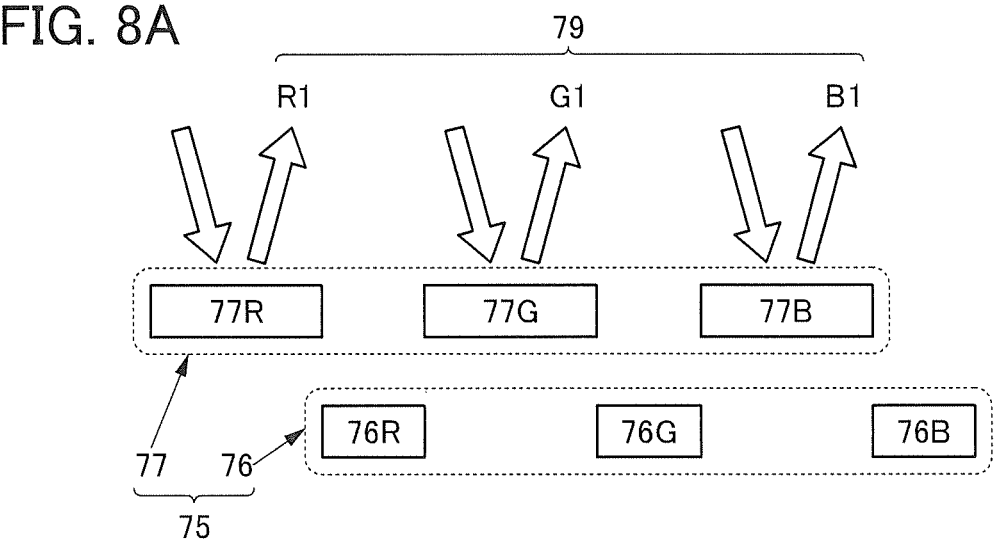
FIGS. 8A to 8C each illustrate a pixel unit.
Figure 8B:
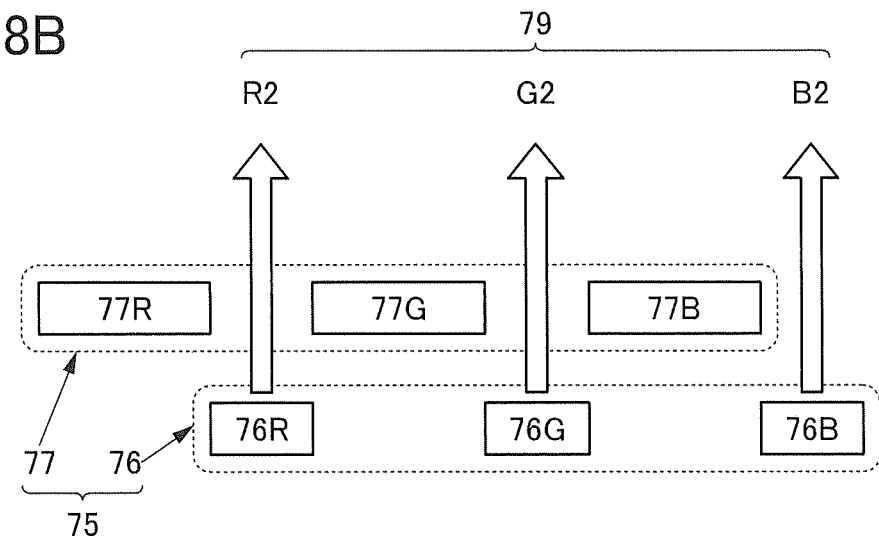
Figure 8C:
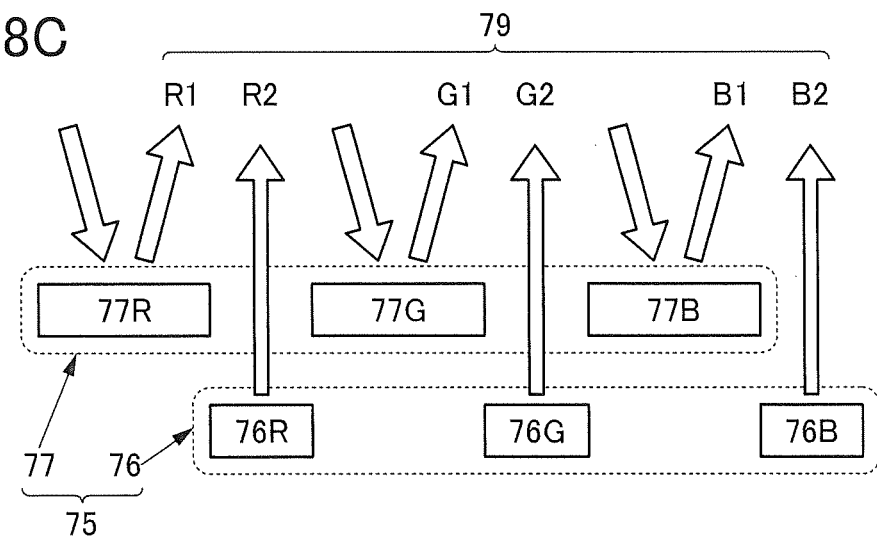

Next, the pixel unit 75 will be described with reference to FIGS. 8A to 8C. FIGS. 8A to 8C are schematic views illustrating structure examples of the pixel unit 75.

The pixel 76 includes the display element 76R, the display element 76G, and the display element 76B. The display element 76R includes a light source and emits, to the display surface side, red light R2 with a luminance corresponding to the gray level of red included in a second gray level input to the pixel 76. Similarly, the display element 76G and the display element 76B emit green light G2 and blue light B2, respectively, to the display surface side.

The pixel 77 includes the display element 77R, the display element 77G, and the display element 77B. The display element 77R reflects external light, which is then extracted to the display surface side as red light R1 with a luminance corresponding to the gray level of red included in a first gray level input to the pixel 77. Similarly, green light G1 and blue light B1 are extracted from the display element 77G and the display element 77B, respectively, to the display surface side.

[First Mode]

FIG. 8A illustrates an example of an operation mode in which an image is displayed by driving the display elements 77R, 77G, and 77B, which reflect external light. As illustrated in FIG. 8A, for example, in the case where the illuminance of external light is sufficiently high, the pixel 76 is not driven and only the colors of the light (the light R1, the light G1, and the light B1) from the pixel 77 are mixed, whereby light 79 of a predetermined color can be extracted from the pixel unit 75 to the display surface side. Thus, driving with extremely low power consumption can be performed.

[Second Mode]

FIG. 8B illustrates an example of an operation mode in which an image is displayed by driving the display elements 76R, 76G, and 76B. As illustrated in FIG. 8B, for example, in the case where the illuminance of external light is extremely low, the pixel 77 is not driven and only the colors of the light (the light R2, the light G2, and the light B2) from the pixel 76 are mixed, whereby the light 79 of a predetermined color can be extracted from the pixel unit 75 to the display surface side. Thus, a clear image can be displayed. Furthermore, the luminance is reduced when the illuminance of external light is low, which can prevent glare for the user and reduce power consumption.

[Third Mode]

FIG. 8C illustrates an example of an operation mode in which an image is displayed by driving both the display elements 77R, 77G, and 77B, which reflect external light, and the display elements 76R, 76G, and 76B, which emit light. As illustrated in FIG. 8C, the six colors of the light, i.e., the light R1, the light G1, the light B1, the light R2, the light G2, and the light B2 are mixed, whereby the light 79 of a predetermined color can be extracted from the pixel unit 75 to the display surface side.

The display panel 11 described in Embodiment 1 includes the display portion 718d including the reflective display element and the display portion 718e including the light-emitting display element and thus is suitably used for displaying the selected region. For example, when the display region 70 is displayed with the reflective display elements, a selected region can be displayed with the light-emitting display elements. Furthermore, when the display region 70 is displayed with the light-emitting display elements, a selected region may be displayed with the reflective display elements. Alternatively, a selected region may be displayed by changing a grayscale data for the reflective display elements, or by changing the grayscale data for the light-emitting display elements.

The above is the description of the structure example of the pixel unit 75.

At least part of this embodiment can be implemented in combination with any of the other embodiments described in this specification as appropriate.

(Embodiment 3)

Hereinafter, a specific structure example of the hybrid display device described in Embodiment 2 will be described. The display panel described below as an example includes both a reflective liquid crystal element and a light-emitting element and can display an image both in a transmissive mode and in a reflective mode.

[Configuration Example]

FIG. 9A is a block diagram illustrating a configuration example of a display device 400. The display device 400 includes a plurality of pixels 410 arranged in a matrix in a display portion 362. Furthermore, the display device 400 includes a circuit GD and a circuit SD. Furthermore, the display device 400 includes a plurality of wirings GD1, a plurality of wirings GD2, a plurality of wirings ANO, and a plurality of wirings CSCOM which are electrically connected to the circuit GD and the plurality of pixels 410 arranged in the direction R. Furthermore, the display device 400 includes a plurality of wirings S1 and a plurality of wirings S2 which are electrically connected to the circuit SD and the plurality of pixels 410 arranged in the direction C.

Although one circuit GD and one circuit SD are provided here for simplicity, the circuit GD and the circuit SD for driving a liquid crystal element and the circuit GD and the circuit SD for driving a light-emitting element may be separately provided.

Each of the pixels 410 includes a reflective liquid crystal element and a light-emitting element. In the pixel 410, the liquid crystal element and the light-emitting element partly overlap with each other.

FIG. 9B1 illustrates a configuration example of a conductive layer 311b included in the pixel 410. The conductive layer 311b functions as a reflective electrode of the liquid crystal element in the pixel 410. The conductive layer 311b has an opening 451.

The dashed line in FIG. 9B1 denotes a light-emitting element 360 positioned in a region overlapping with the conductive layer 311b. The light-emitting element 360 overlaps with the opening 451 of the conductive layer 311b. Thus, light emitted from the light-emitting element 360 is extracted to the display surface side through the opening 451.

In FIG. 9B1, the pixels 410 adjacent in the direction R are pixels of different colors. As illustrated in FIG. 9B1, the openings 451 in two pixels adjacent in the direction R are preferably provided in different positions in the conductive layers 311b so as not to be arranged in a line. This allows two adjacent light-emitting elements 360 to be apart from each other, thereby preventing light emitted from the light-emitting element 360 from entering a coloring layer included in the adjacent pixel 410 (such a phenomenon is also referred to as crosstalk). Furthermore, since two adjacent light-emitting elements 360 can be arranged apart from each other, a high-resolution display device can be obtained even when EL layers of the light-emitting elements 360 are separately formed with a mask or the like.

Alternatively, the arrangement illustrated in FIG. 9B2 may be employed.

If the ratio of the total area of the opening 451 to the total area excluding the opening is too large, display performed using the liquid crystal element is dark. If the ratio of the total area of the opening 451 to the total area excluding the opening is too small, display performed using the light-emitting element 360 is dark.

If the area of the opening 451 of the conductive layer 311b functioning as a reflective electrode is too small, the extraction efficiency of light emitted from the light-emitting element 360 is decreased.

The opening 451 may have a polygonal shape, a quadrangular shape, an elliptical shape, a circular shape, a cross shape, a stripe shape, a slit shape, or a checkered pattern, for example. The opening 451 may be provided close to the adjacent pixel. The opening 451 is preferably provided close to another pixel displaying the same color, in which case crosstalk can be suppressed.

[Circuit Configuration Example]

Figure 10:
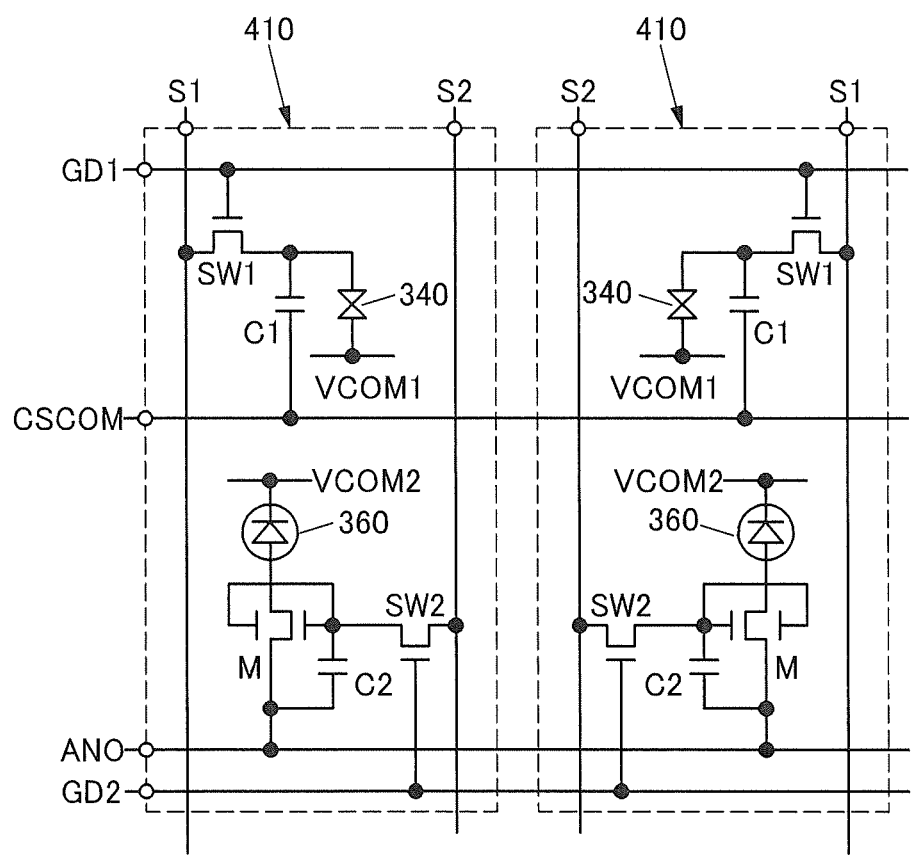
FIG. 10 illustrates a circuit of a display device.

FIG. 10 is a circuit diagram illustrating a configuration example of the pixel 410. FIG. 10 illustrates two adjacent pixels 410.

The pixel 410 includes a switch SW1, a capacitor C1, a liquid crystal element 340, a switch SW2, a transistor M, a capacitor C2, the light-emitting element 360, and the like. The pixel 410 is electrically connected to the wiring GD1, the wiring GD2, the wiring ANO, the wiring CSCOM, the wiring S1, and the wiring S2. FIG. 10 also illustrates a wiring VCOM1 which is electrically connected to the liquid crystal element 340 and a wiring VCOM2 which is electrically connected to the light-emitting element 360.

FIG. 10 illustrates an example in which transistors are used as the switches SW1 and SW2.

A gate of the switch SW1 is connected to the wiring GD1. One of a source and a drain of the switch SW1 is connected to the wiring S1, and the other of the source and the drain is connected to one electrode of the capacitor C1 and one electrode of the liquid crystal element 340. The other electrode of the capacitor C1 is connected to the wiring CSCOM. The other electrode of the liquid crystal element 340 is connected to the wiring VCOM1.

A gate of the switch SW2 is connected to the wiring GD2. One of a source and a drain of the switch SW2 is connected to the wiring S2, and the other of the source and the drain is connected to one electrode of the capacitor C2 and a gate of the transistor M. The other electrode of the capacitor C2 is connected to one of a source and a drain of the transistor M and the wiring ANO. The other of the source and the drain of the transistor M is connected to one electrode of the light-emitting element 360. The other electrode of the light-emitting element 360 is connected to the wiring VCOM2.

FIG. 10 illustrates an example in which the transistor M includes two gates connected to each other with a semiconductor positioned therebetween. This structure can increase current that can flow through the transistor M.

The wiring GD1 can be supplied with a signal for changing the on/off state of the switch SW1. A predetermined potential can be supplied to the wiring VCOM1. The wiring S1 can be supplied with a signal for changing the alignment state of liquid crystal included in the liquid crystal element 340. A predetermined potential can be supplied to the wiring CSCOM.

The wiring GD2 can be supplied with a signal for changing the on/off state of the switch SW2. The wiring VCOM2 and the wiring ANO can be supplied with potentials having a difference large enough to make the light-emitting element 360 emit light. The wiring S2 can be supplied with a signal for changing the conduction state of the transistor M.

In the reflective mode, for example, display can be performed by driving the pixel 410 in FIG. 10 with the signals supplied to the wiring GD1 and the wiring S1 and utilizing the optical modulation of the liquid crystal element 340. In the transmissive mode, display can be performed by driving the pixel with the signals supplied to the wiring GD2 and the wiring S2 to make the light-emitting element 360 emit light. In the case where both driving modes are combined, the pixel can be driven with the signals supplied to the wiring GD1, the wiring GD2, the wiring S1, and the wiring S2.

Figure 11A:
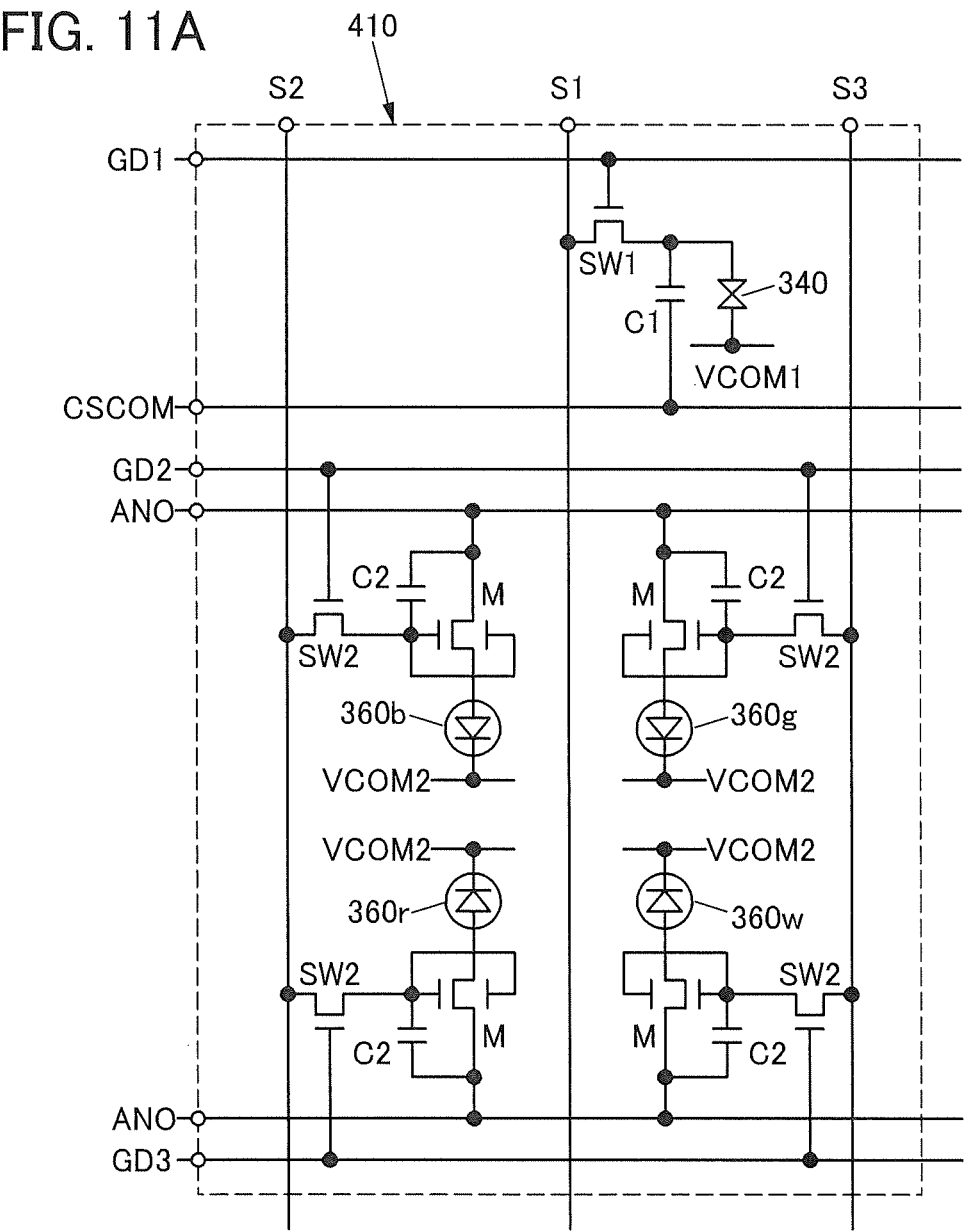
FIG. 11A illustrates a circuit of a display device.

Note that one embodiment of the present invention is not limited to the example illustrated in FIG. 10, in which one pixel 410 includes one liquid crystal element 340 and one light-emitting element 360. FIG. 11A illustrates an example in which one pixel 410 includes one liquid crystal element 340 and four light-emitting elements 360 (light-emitting elements 360r, 360g, 360b, and 360w).

In FIG. 11A, in addition to the wirings in FIG. 10, a wiring GD3 and a wiring S3 are connected to the pixel 410.

In the example illustrated in FIG. 11A, for example, light-emitting elements which exhibit red (R), green (G), blue (B), and white (W) can be used as the four light-emitting elements 360. A reflective liquid crystal element which exhibits white can be used as the liquid crystal element 340. This enables white display with high reflectivity in the reflective mode. This also enables low-power display with excellent color-rendering properties in the transmissive mode.

Figure 11B:
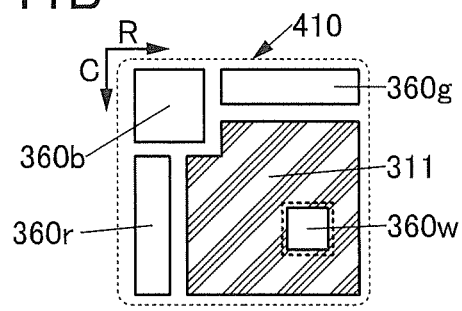
FIG. 11B is a top view of pixels.

FIG. 11B illustrates a configuration example of the pixel 410. The pixel 410 includes the light-emitting element 360w which overlaps with an opening of an electrode 311 and the light-emitting elements 360r, 360g, and 360b which are located in the periphery of the electrode 311. It is preferable that the light-emitting elements 360r, 360g, and 360b have substantially the same light-emitting area.

[Structure Example of Display Panel]

Figure 12:
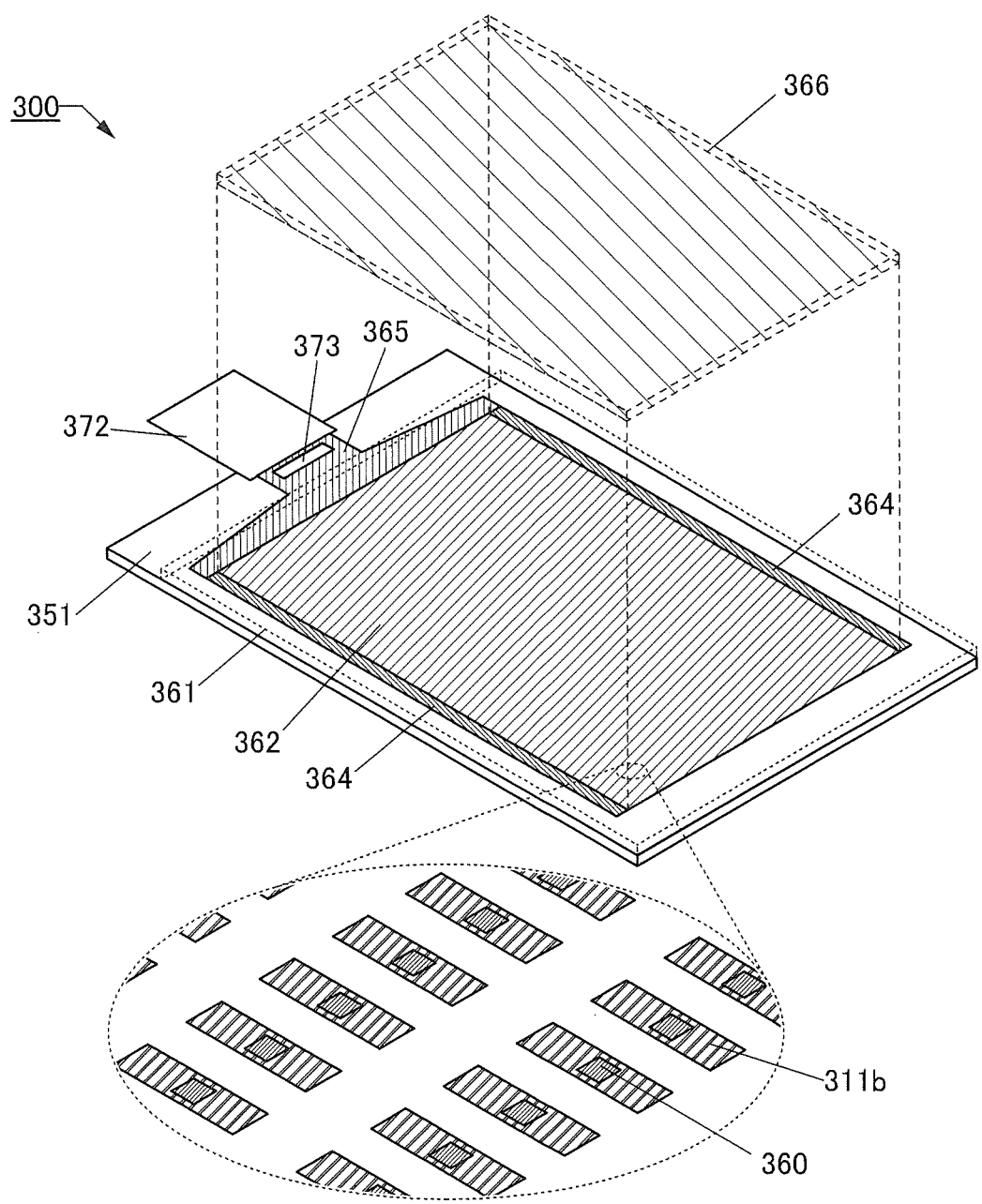
FIG. 12 illustrates a structure of a display device.

FIG. 12 is a schematic perspective view of a display panel 300 of one embodiment of the present invention. In the display panel 300, a substrate 351 and a substrate 361 are attached to each other. In FIG. 12, the substrate 361 is denoted by a dashed line.

The display panel 300 includes a display portion 362, a circuit 364, a wiring 365, and the like. For example, the substrate 351 is provided with the circuit 364, the wiring 365, and the conductive layer 311b that functions as a pixel electrode. FIG. 12 illustrates an example in which an IC 373 and an FPC 372 are mounted on the substrate 351. Thus, the structure illustrated in FIG. 12 can be referred to as a display module including the display panel 300, the FPC 372, and the IC 373.

As the circuit 364, for example, a circuit functioning as a scan line driver circuit can be used.

The wiring 365 has a function of supplying signals and power to the display portion and the circuit 364. The signals and the power are input to the wiring 365 from the outside through the FPC 372 or from the IC 373.

FIG. 12 illustrates an example in which the IC 373 is provided over the substrate 351 by a chip on glass (COG) method or the like. As the IC 373, for example, an IC functioning as a scan line driver circuit or a signal line driver circuit can be used. Note that the IC 373 may be omitted, for example, when the display panel 300 includes circuits functioning as a scan line driver circuit and a signal line driver circuit or when circuits functioning as a scan line driver circuit and a signal line driver circuit are externally provided and signals for driving the display panel 300 are input through the FPC 372. Alternatively, the IC 373 may be mounted on the FPC 372 by a chip on film (COF) method or the like.

FIG. 12 illustrates an enlarged view of part of the display portion 362. The conductive layers 311b included in a plurality of display elements are arranged in a matrix in the display portion 362. The conductive layer 311b has a function of reflecting visible light and serves as a reflective electrode of the liquid crystal element 340 described later.

As illustrated in FIG. 12, the conductive layer 311b has an opening. The light-emitting element 360 is positioned closer to the substrate 351 than the conductive layer 311b. Light is emitted from the light-emitting element 360 to the substrate 361 side through the opening of the conductive layer 311b.

Furthermore, an input device 366 can be provided over the substrate 361. For example, a sheet-like capacitive touch sensor may be provided so as to overlap with the display portion 362. Alternatively, the touch sensor may be provided between the substrate 361 and the substrate 351. In the case where the touch sensor is provided between the substrate 361 and the substrate 351, an optical touch sensor including a photoelectric conversion element as well as a capacitive touch sensor may be used.

[Cross-sectional Structure Example 1]

Figure 13:
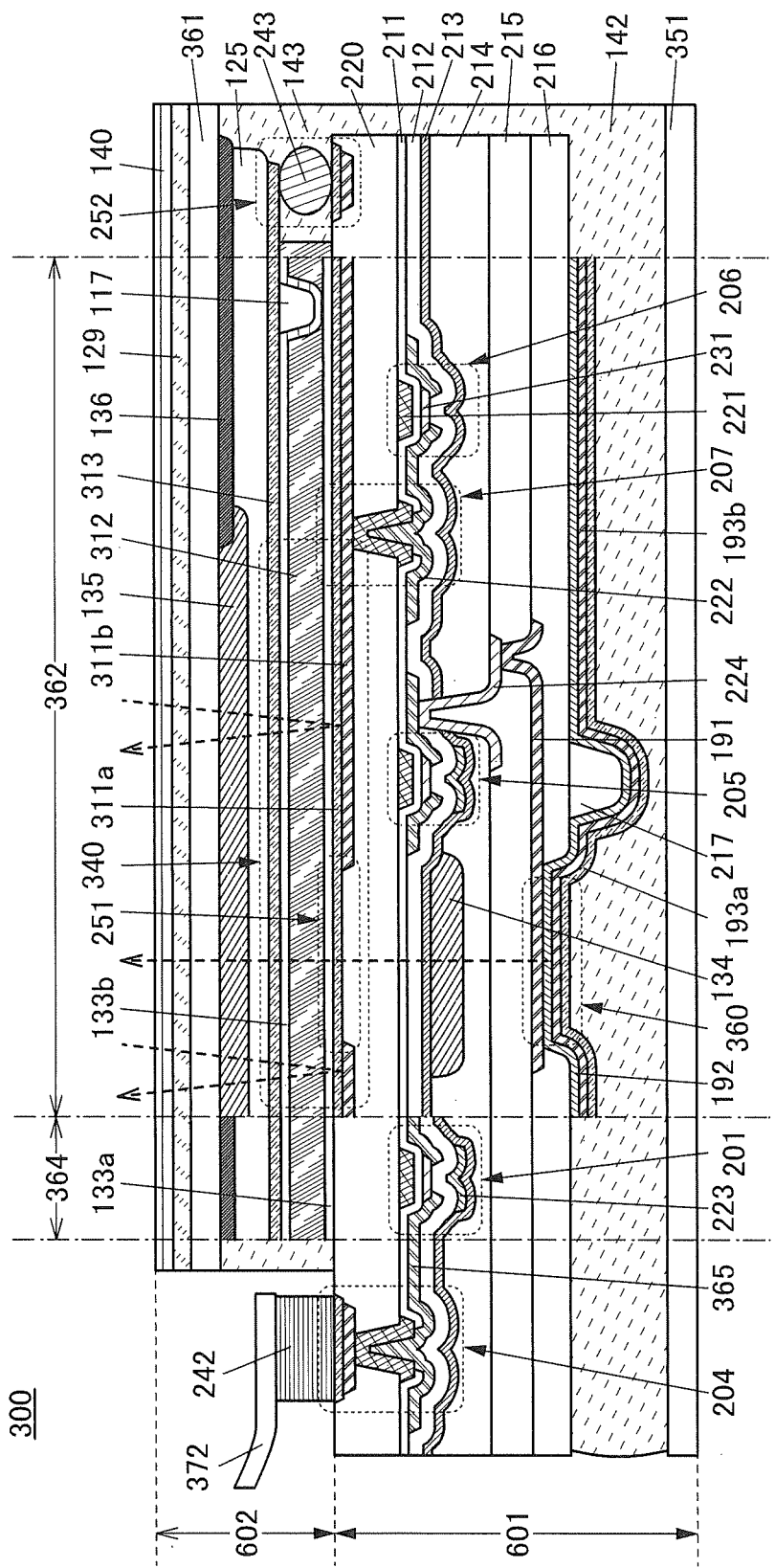
FIG. 13 illustrates a structure of a display device.

FIG. 13 illustrates an example of cross sections of part of a region including the FPC 372, part of a region including the circuit 364, and part of a region including the display portion 362 of the display panel illustrated as an example in FIG. 12.

The display panel includes an insulating layer 220 between the substrate 351 and the substrate 361. The light-emitting element 360, a transistor 201, a transistor 205, a transistor 206, a coloring layer 134, and the like are provided between the substrate 351 and the insulating layer 220. The liquid crystal element 340, a coloring layer 135, and the like are provided between the insulating layer 220 and the substrate 361. The substrate 361 and the insulating layer 220 are attached to each other with an adhesive layer 143. The substrate 351 and the insulating layer 220 are attached to each other with an adhesive layer 142.

The transistor 206 is electrically connected to the liquid crystal element 340, and the transistor 205 is electrically connected to the light-emitting element 360. The transistor 205 and the transistor 206, which are both formed on a surface of the insulating layer 220 on the substrate 351 side, can be formed through the same process.

The substrate 361 is provided with the coloring layer 135, a light-blocking layer 136, an insulating layer 125, a conductive layer 313 functioning as a common electrode of the liquid crystal element 340, an alignment film 133b, an insulating layer 117, and the like. The insulating layer 117 functions as a spacer for holding a cell gap of the liquid crystal element 340.

Insulating layers such as an insulating layer 211, an insulating layer 212, an insulating layer 213, an insulating layer 214, and an insulating layer 215 are provided on the substrate 351 side of the insulating layer 220. Part of the insulating layer 211 functions as a gate insulating layer of each transistor. The insulating layer 212, the insulating layer 213, and the insulating layer 214 are provided to cover the transistors. The insulating layer 215 is provided to cover the insulating layer 214. The insulating layer 214 and the insulating layer 215 each function as a planarization layer.

Note that here, the three insulating layers, the insulating layer 212, the insulating layer 213, and the insulating layer 214, are provided to cover the transistors and the like; however, the number of insulating layers is not limited to three and may be one, two, or four or more. The insulating layer 214 functioning as a planarization layer is not necessarily provided.

The transistor 201, the transistor 205, and the transistor 206 each include a conductive layer 221 part of which functions as a gate, conductive layers 222 part of which functions as a source and a drain, and a semiconductor layer 231. Here, a plurality of layers obtained by processing the same conductive film is shown with the same hatching pattern.

The liquid crystal element 340 is a reflective liquid crystal element. The liquid crystal element 340 has a structure in which a conductive layer 370, liquid crystal 312, and the conductive layer 313 are stacked. The conductive layer 311b that reflects visible light is provided in contact with a surface of the conductive layer 370 on the substrate 351 side. The conductive layer 311b has an opening 251. The conductive layer 370 and the conductive layer 313 each contain a material that transmits visible light. In addition, an alignment film 133a is provided between the liquid crystal 312 and the conductive layer 370, and the alignment film 133b is provided between the liquid crystal 312 and the conductive layer 313.

A light diffusion plate 129 and a polarizing plate 140 are provided on an outer surface of the substrate 361. As the polarizing plate 140, a linear polarizing plate or a circularly polarizing plate can be used. An example of a circularly polarizing plate is a stack of a linear polarizing plate and a quarter-wave retardation plate. Such a structure can suppress reflection of external light. The light diffusion plate 129 is provided to suppress reflection of external light. The cell gap, alignment, drive voltage, and the like of the liquid crystal element used as the liquid crystal element 340 are adjusted depending on the kind of the polarizing plate so that desirable contrast is obtained.

In the liquid crystal element 340, the conductive layer 311b has a function of reflecting visible light, and the conductive layer 313 has a function of transmitting visible light. Light entering from the substrate 361 side is polarized by the polarizing plate 140, passes through the conductive layer 313 and the liquid crystal 312, and is reflected by the conductive layer 311b. Then, the light passes through the liquid crystal 312 and the conductive layer 313 again and reaches the polarizing plate 140. In this case, optical modulation of the light can be controlled by controlling the alignment of the liquid crystal with a voltage applied between the conductive layer 311b and the conductive layer 313. That is, the intensity of light extracted through the polarizing plate 140 can be controlled. Light other than that in a particular wavelength region is absorbed by the coloring layer 135, so that red light is extracted, for example.

The light-emitting element 360 is a bottom-emission light-emitting element. The light-emitting element 360 has a structure in which a conductive layer 191, an EL layer 192, and a conductive layer 193b are stacked in this order from the insulating layer 220 side. In addition, a conductive layer 193a is provided to cover the conductive layer 193b. The conductive layer 193b contains a material that reflects visible light, and the conductive layer 191 and the conductive layer 193a each contain a material that transmits visible light. Light is emitted from the light-emitting element 360 to the substrate 361 side through the coloring layer 134, the insulating layer 220, the opening 251, the conductive layer 313, and the like.

Here, as illustrated in FIG. 13, the opening 251 is preferably provided with the conductive layer 370 which transmits visible light. Accordingly, the liquid crystal 312 is aligned in a region overlapping with the opening 251 as well as in the other region; therefore, an alignment defect of the liquid crystal in a boundary portion between these regions, which might cause undesired light leakage, can be suppressed.

An insulating layer 217 is provided over the insulating layer 216 which covers an end portion of the conductive layer 191. The insulating layer 217 functions as a spacer that prevents the substrate 351 from being unnecessarily close to the insulating layer 220. In addition, in the case where the EL layer 192 or the conductive layer 193a is formed using a shielding mask (metal mask), the insulating layer 217 may have a function of preventing the shielding mask from being in contact with a surface on which the EL layer 192 or the conductive layer 193a is to be formed. Note that the insulating layer 217 is not necessarily provided.

One of a source and a drain of the transistor 205 is electrically connected to the conductive layer 191 of the light-emitting element 360 through a conductive layer 224.

One of a source and a drain of the transistor 206 is electrically connected to the conductive layer 311b through a connection portion 207. The conductive layer 311b and the conductive layer 370 are in contact with and electrically connected to each other. In the connection portion 207, the conductive layers provided on both surfaces of the insulating layer 220 are connected to each other through an opening of the insulating layer 220.

A connection portion 204 is provided in a region in which the substrate 351 and the substrate 361 do not overlap with each other. The connection portion 204 is electrically connected to the FPC 372 through a connection layer 242. The connection portion 204 has a structure similar to that of the connection portion 207. On the top surface of the connection portion 204, a conductive layer obtained by processing the same conductive film as the conductive layer 370 is exposed. Thus, the connection portion 204 and the FPC 372 can be electrically connected to each other through the connection layer 242.

A connection portion 252 is provided in part of a region in which the adhesive layer 143 is provided. In the connection portion 252, a conductive layer obtained by processing the same conductive film as the conductive layer 370 is electrically connected to part of the conductive layer 313 through a connector 243. Accordingly, a signal or a potential input from the FPC 372 connected on the substrate 351 side can be supplied to the conductive layer 313 formed on the substrate 361 side through the connection portion 252.

As the connector 243, for example, a conductive particle can be used. As the conductive particle, a particle of an organic resin, silica, or the like coated with a metal material can be used. It is preferable to use nickel or gold as the metal material because contact resistance can be reduced. It is also preferable to use a particle coated with layers of two or more kinds of metal materials, such as a particle coated with nickel and further with gold. As the connector 243, a material capable of elastic deformation or plastic deformation is preferably used. As illustrated in FIG. 13, the connector 243 which is a conductive particle has a vertically crushed shape in some cases. Accordingly, the contact area between the connector 243 and a conductive layer electrically connected to the connector 243 is increased, so that contact resistance can be reduced and problems such as disconnection can be suppressed.

The connector 243 is preferably provided so as to be covered with the adhesive layer 143. For example, the connector 243 may be dispersed in the adhesive layer 143 which is not cured yet.

FIG. 13 illustrates an example of the circuit 364 in which the transistor 201 is provided.

In FIG. 13, for example, the transistor 201 and the transistor 205 each have a structure in which the semiconductor layer 231 in which a channel is formed is provided between two gates. One of the gates is formed using the conductive layer 221, and the other gate is formed using a conductive layer 223 which overlaps with the semiconductor layer 231 with the insulating layer 212 positioned therebetween. Such a structure enables the control of the threshold voltage of the transistor. In this case, the two gates may be connected to each other and supplied with the same signal to operate the transistor. Such a transistor can have higher field-effect mobility and a higher on-state current than other transistors. Consequently, a circuit capable of high-speed operation can be formed. Furthermore, the area occupied by a circuit portion can be reduced. The use of the transistor having a high on-state current can reduce signal delay in wirings and suppress display unevenness even when the number of wirings is increased owing to an increase in the size or resolution of the display panel.

Note that the transistor included in the circuit 364 and the transistor included in the display portion 362 may have the same structure. A plurality of transistors included in the circuit 364 may have the same structure or different structures. A plurality of transistors included in the display portion 362 may have the same structure or different structures.

A material inhibiting diffusion of impurities such as water and hydrogen is preferably used for at least one of the insulating layers 212 and 213 which cover the transistors. That is, the insulating layer 212 or the insulating layer 213 can function as a barrier film. Such a structure can effectively suppress diffusion of the impurities into the transistors from the outside, and thus, a highly reliable display panel can be provided.

The insulating layer 125 is provided on the substrate 361 side to cover the coloring layer 135 and the light-blocking layer 136. The insulating layer 125 may function as a planarization layer. The insulating layer 125 enables the conductive layer 313 to have a substantially flat surface, resulting in a uniform alignment state of the liquid crystal 312.

[Cross-sectional Structure Example 2]

Figure 14:
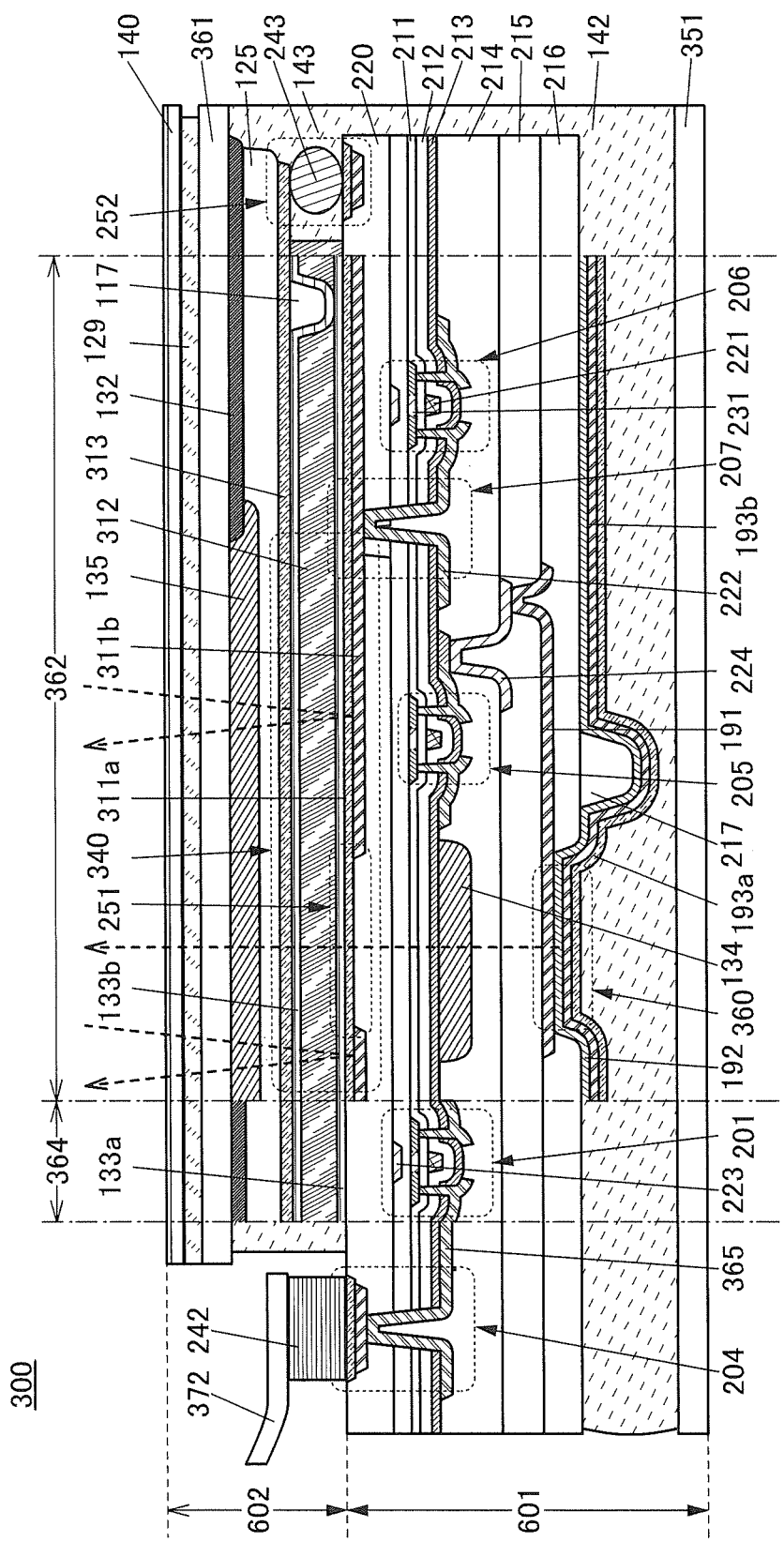
FIG. 14 illustrates a structure of a display device.

FIG. 14 illustrates an example of a display panel in which a top-gate transistor is used as each transistor in the structure illustrated in FIG. 13. The use of a top-gate transistor can reduce parasitic capacitance, leading to an increase in the frame frequency of display.

A transistor included in the display device of one embodiment of the present invention includes a conductive layer functioning as a gate electrode, a semiconductor layer, a conductive layer functioning as a source electrode, a conductive layer functioning as a drain electrode, and an insulating layer functioning as a gate insulating layer.

Note that there is no particular limitation on the structure of the transistor. For example, a planar transistor, a staggered transistor, or an inverted staggered transistor may be used. Furthermore, a top-gate transistor or a bottom-gate transistor may be used. Gate electrodes may be provided above and below a channel.

There is no particular limitation on the crystallinity of a semiconductor material used for the transistor, and an amorphous semiconductor or a semiconductor having crystallinity (a microcrystalline semiconductor, a polycrystalline semiconductor, a single-crystal semiconductor, or a semiconductor partly including crystal regions) may be used. A semiconductor having crystallinity is preferably used because deterioration of the transistor characteristics can be suppressed.

As a semiconductor material used for the transistor, a metal oxide whose energy gap is greater than or equal to 2 eV, preferably greater than or equal to 2.5 eV, further preferably greater than or equal to 3 eV can be used. As a typical example, an oxide semiconductor containing indium can be given.

A transistor including an oxide semiconductor which has a wider bandgap and a lower carrier density than silicon has a low off-state current; therefore, charge accumulated in a capacitor that is series-connected to the transistor can be retained for a long time.

As the semiconductor layer, for example, a film represented by an In-M-Zn-based oxide which contains indium, zinc, and M (a metal such as aluminum, titanium, gallium, germanium, yttrium, zirconium, lanthanum, cerium, tin, neodymium, or hafnium), an In-M-based oxide, an M-Zn-based oxide, or an In—Zn-based oxide can be used.

In the case where the oxide semiconductor included in the semiconductor layer is an In-M-Zn-based oxide, the atomic ratio of metal elements in a sputtering target used for depositing the In-M-Zn-based oxide preferably satisfies In≥M and Zn≥M. The atomic ratio of metal elements in such a sputtering target is preferably In:M:Zn=1:1:1, In:M:Zn=1:1:1.2, In:M:Zn=3:1:2, In:M:Zn=4:2:3, In:M:Zn=4:2:4.1, In:M:Zn=5:1:6, In:M:Zn=5:1:7, In:M:Zn=5:1:8, or the like. Note that the atomic ratio of metal elements in the deposited semiconductor layer may deviate from the above atomic ratio of metal elements in the sputtering target within a range of ±40%.

A metal oxide containing the above material or the like can function as a light-transmitting conductor by adjusting impurities, oxygen vacancies, and the like. Thus, when the components of the transistor such as the source electrode, the drain electrode, and the gate electrode, in addition to the semiconductor layer, are formed using a light-transmitting conductor, a light-transmitting transistor can be fabricated. The use of the light-transmitting transistor in a pixel of a display device allows light passing through a display element or light emitted from the display element to pass through the transistor; thus, the aperture ratio can be improved.

Figure 15:
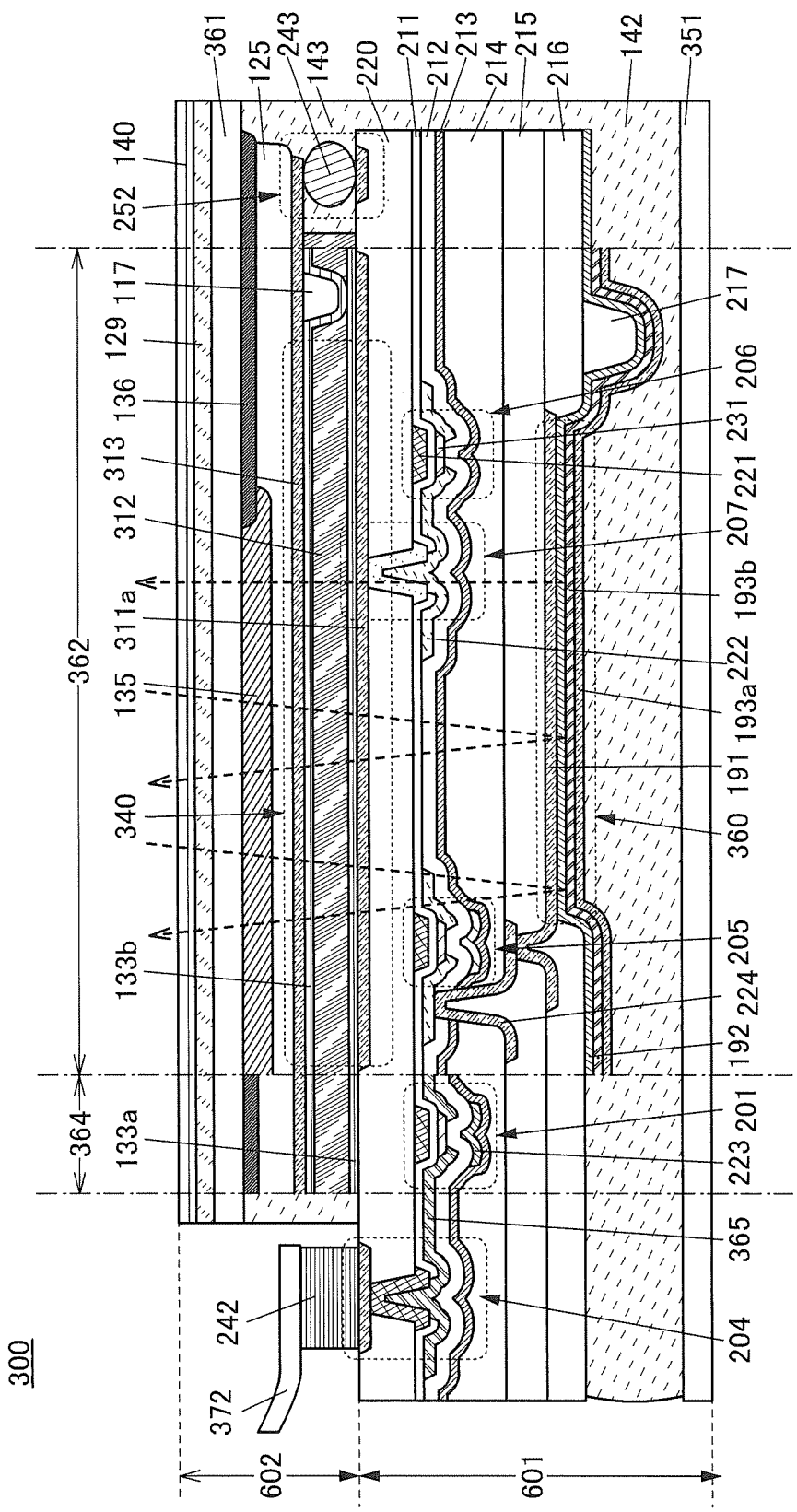
FIG. 15 illustrates a structure of a display device.

For example, as in a modification example of Cross-sectional structure example 1 illustrated in FIG. 15, components of the transistors 205 and 206 and the connection portion 207 can be formed using the light-transmitting conductor. When the conductive layer 311b is not provided in the structure in Cross-sectional structure example 1, light emitted from the light-emitting element 360 can pass through part or the whole of the transistors 205 and 206 and the connection portion 207. Furthermore, light entering from the substrate 361 side and passing through the liquid crystal 312 can be reflected by the conductive layer 193b. To improve the reliability of the transistors 205 and 206, one or both of a conductive layer functioning as a gate electrode and a conductive layer functioning as a backgate electrode may be formed using a material which does not have a light-transmitting property, such as metal.

Silicon may be used as a semiconductor in which a channel of the transistor is formed. Although amorphous silicon may be used as silicon, silicon having crystallinity is particularly preferable. For example, microcrystalline silicon, polycrystalline silicon, or single-crystal silicon is preferably used. In particular, polycrystalline silicon can be formed at a lower temperature than single-crystal silicon and has higher field-effect mobility and a higher reliability than amorphous silicon.

Figure 16A:
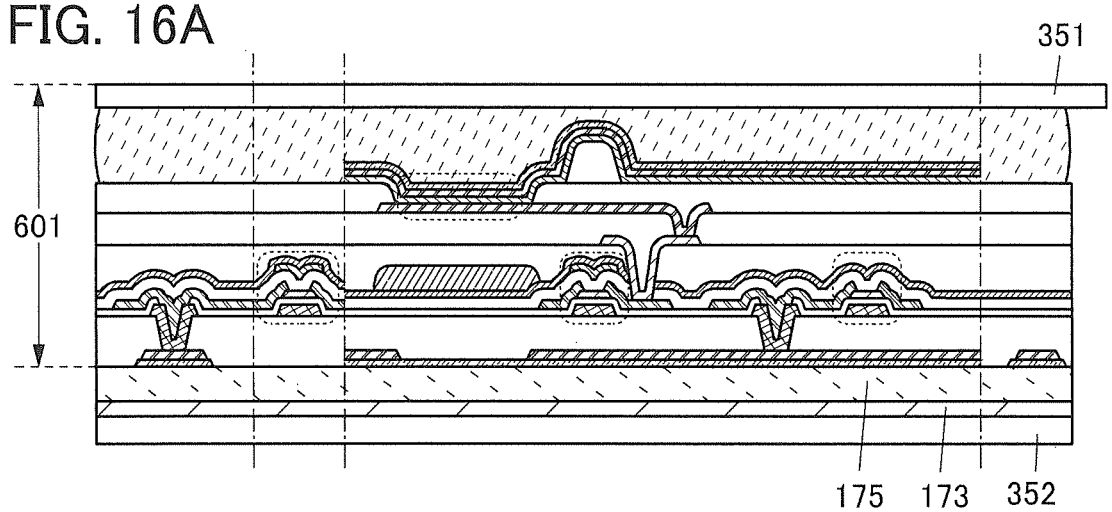
FIGS. 16A to 16C illustrate a method for manufacturing a display device.

The above-described display panel 300 is broadly divided into a region 601 including the light-emitting element, the transistors, and the like, and a region 602 including the liquid crystal element and the like. A method for manufacturing the display panel 300 will be briefly described below with reference to FIGS. 16A to 16C.

Figure 16B:
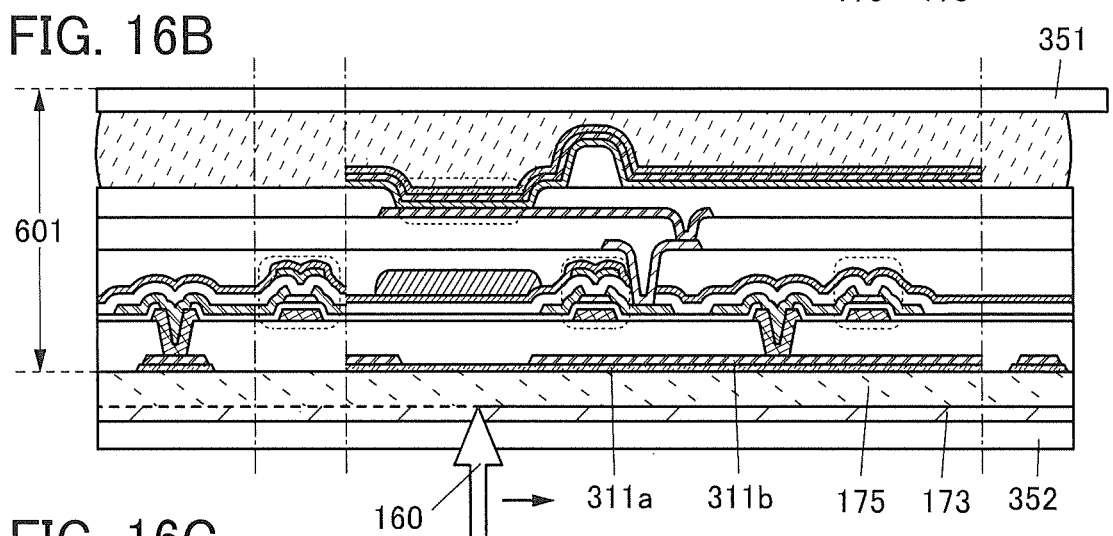
Figure 16C:
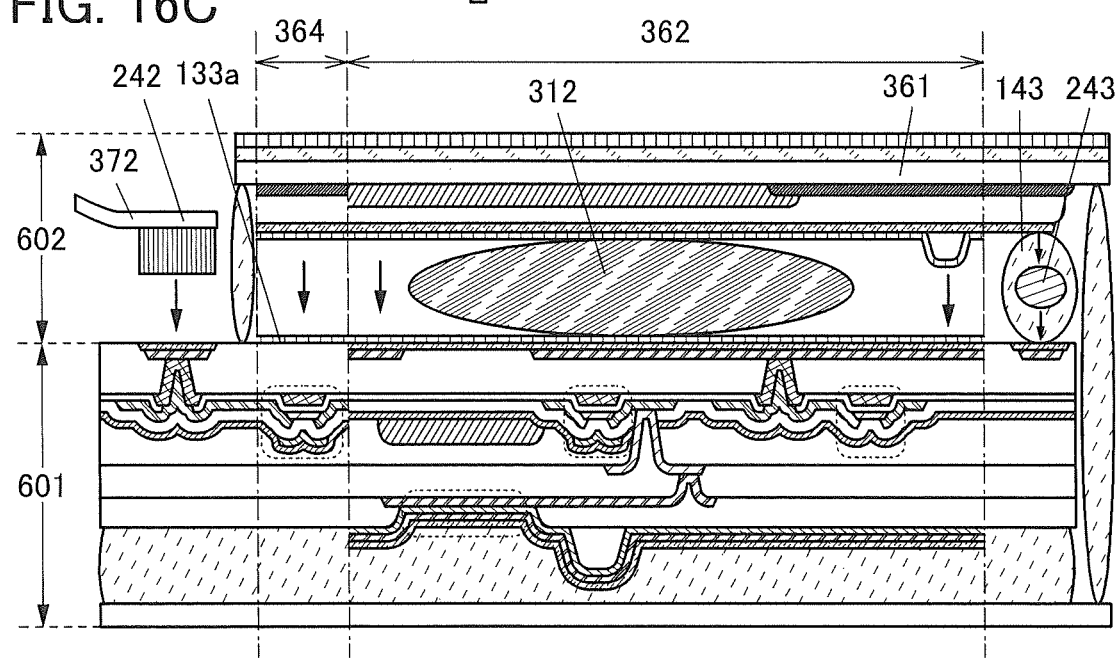

The display panel 300 can be manufactured relatively easily with the use of a separation process (see FIG. 16B). First, a separation layer 173 and a resin layer 175 are provided over a substrate 352, and the region 601 is fabricated over the resin layer 175 (see FIG. 16A).

Next, a processing region (region including the separation layer 173 and the resin layer 175) is irradiated with laser light 160 (see FIG. 16B), and the substrate 352 and the separation layer 173 are removed.

After that, the resin layer 175 is removed by ashing treatment, so that the conductive layer 370 and the like are exposed. Then, the alignment film 133a is formed in a region to be the display portion, and the other components of the region 602 that are separately formed are bonded to the alignment film 133 a with the adhesive layer 143 so that the liquid crystal 312 is sandwiched therebetween (see FIG. 16C). Through the above process, the display panel 300 can be completed.

At least part of this embodiment can be implemented in combination with any of the other embodiments described in this specification as appropriate.

(Embodiment 4)

In this embodiment, structure examples of a pixel included in a display device will be described with reference to FIGS. 17A1, 17A2, and 17B and FIGS. 18A1, 18A2, and 18B. FIGS. 17A1, 17A2, and 17B illustrate a structure example of a light-emitting display device, and FIGS. 18A1, 18A2, and 18B illustrate a structure example of a liquid crystal display device.

[Pixel]

First, a pixel of the light-emitting display device will be described with reference to FIGS. 17A1, 17A2, and 17B.

FIG. 17A1 is a schematic top view of a pixel 900 seen from the display surface side. The pixel 900 in FIG. 17A1 includes three subpixels. Each of the subpixels includes a light-emitting element 930EL (not illustrated in FIGS. 17A1 and 17A2), a transistor 910, and a transistor 912. In FIG. 17A1, each of the subpixels has a light-emitting region (a light-emitting region 916R, a light-emitting region 916G, or a light-emitting region 916B) of the light-emitting element 930EL. The light-emitting element 930EL emits light toward the transistors 910 and 912; that is, it is a bottom-emission light-emitting element.

In addition, the pixel 900 includes a wiring 902, a wiring 904, a wiring 906, and the like. The wiring 902 serves as a scan line, for example. The wiring 904 serves as a signal line, for example. The wiring 906 serves as a power source line for supplying a potential to the light-emitting element, for example. The wiring 902 intersects with the wiring 904. The wiring 902 intersects with the wiring 906. Although the example here shows the structure where the wiring 902 intersects with the wirings 904 and 906, the structure is not limited thereto, and the wiring 904 may intersect with the wiring 906.

The transistor 910 serves as a selection transistor. A gate of the transistor 910 is electrically connected to the wiring 902. One of a source and a drain of the transistor 910 is electrically connected the wiring 904.

The transistor 912 controls a current flowing to the light-emitting element. A gate of the transistor 912 is electrically connected to the other of the source and the drain of the transistor 910. One of a source and a drain of the transistor 912 is electrically connected to the wiring 906, and the other is electrically connected to one of a pair of electrodes of the light-emitting element 930EL.

In FIG. 17A1, the light-emitting regions 916R, 916G, and 916B each have a strip shape long in the vertical direction, and they are arranged in the horizontal direction to form a striped pattern.

The wirings 902, 904, and 906 each have a light-blocking property. Layers included in the transistor 910, the transistor 912, a wiring connected to the transistor, a contact, a capacitor, and the like, that is, layers other than the layers included in the above wirings, are each preferably a light-transmitting film. In FIG. 17A2, a transmissive region 900t that transmits visible light and a light-blocking region 900s that blocks visible light, which are included in the pixel 900 of FIG. 17A1, are separately illustrated. As illustrated in the drawing, when the transistor is formed with a light-transmitting film, a portion other than the area where the wirings are provided can be the transmissive region 900t. Furthermore, the light-emitting region of the light-emitting element can overlap with the transistor, the wiring connected to the transistor, the contact, the capacitor, and the like, and thus the aperture ratio of the pixel can be increased.

The higher the proportion of the area of the transmissive region to the area of the pixel is, the higher the light extraction efficiency of the light-emitting element is. The proportion of the area of the transmissive region to the area of the pixel is, for example, greater than or equal to 1% and less than or equal to 95%, preferably greater than or equal to 10% and less than or equal to 90%, further preferably greater than or equal to 20% and less than or equal to 80%. A particularly preferable proportion is greater than or equal to 40% or greater than or equal to 50%, still preferably greater than or equal to 60% and less than or equal to 80%.

FIG. 17B is a cross-sectional view corresponding to a cross section along dashed-dotted line A-B in FIG. 17A2. FIG. 17B also illustrates cross sections of the light-emitting element 930EL, a capacitor 913, a driver circuit portion 901, and the like that are not illustrated in the top views. The driver circuit portion 901 can be used as a scan line driver circuit portion or a signal line driver circuit portion. The driver circuit portion 901 includes a transistor 911.

As illustrated in FIG. 17B, the light-emitting element 930EL emits light in the direction of a dashed arrow. The light from the light-emitting element 930EL is extracted to the outside through the transistor 910, the transistor 912, the capacitor 913, and the like. Thus, a film included in the capacitor 913 or the like also preferably has a light-transmitting property. The increased area of the light-transmitting region of the capacitor 913 can decrease attenuation of light emitted from the light-emitting element 930EL.

The transistor 911 in the driver circuit portion 901 may have a light-blocking property. When the transistor 911 and the like in the driver circuit portion 901 have light-blocking properties, the reliability of a driver circuit portion and the drive capability can be heightened. Thus, it is preferable to use light-blocking conductive films for a gate electrode, a source electrode, and a drain electrode of the transistor 911. Wirings connected to them are also preferably formed with light-blocking conductive films.

Another example of the pixel included in the liquid crystal display device will be described with reference to FIGS. 18A1, 18A2, and 18B.

FIG. 18A1 is a schematic top view of the pixel 900. The pixel 900 in FIG. 18A1 includes four subpixels. In the example of FIG. 18A1, the subpixels in the pixel 900 are arranged in two rows and two columns. Each of the subpixels includes a transmissive liquid crystal element 930LC (not illustrated in FIGS. 18A1 and 18A2), a transistor 914, and the like. In FIG. 18A1, the two wirings 902 and the two wirings 904 are provided in the pixel 900. In FIG. 18A1, each of the subpixels has a display region (a display region 918R, a display region 918G, a display region 918B, or a display region 918W) of the liquid crystal element. Light emitted from a backlight unit (BLU) enters the liquid crystal element 930LC through the transistor 914 and the like.

In addition, the pixel 900 includes the wiring 902, the wiring 904, and the like. The wiring 902 serves as a scan line, for example. The wiring 904 serves as a signal line, for example. The wiring 902 intersects with the wiring 904.

The transistor 914 serves as a selection transistor. A gate of the transistor 914 is electrically connected to the wiring 902. One of a source and a drain of the transistor 914 is electrically connected the wiring 904, and the other is electrically connected to the liquid-crystal element 930LC.

The wirings 902 and 904 each have a light-blocking property. Layers included in the transistor 914, a wiring connected to the transistor 914, a contact, a capacitor, and the like, that is, layers other than the layers included in the above wirings, are each preferably a light-transmitting film. In FIG. 18A2, the transmissive region 900t that transmits visible light and the light-blocking region 900s that blocks visible light, which are included in the pixel 900 of FIG. 18A1, are separately illustrated. As illustrated in the drawing, when the transistor is formed with a light-transmitting film, a portion other than the area where the wirings are provided can be the transmissive region 900t. Furthermore, the transmissive region of the liquid crystal element can overlap with the transistor, the wiring connected to the transistor, the contact, the capacitor, and the like, and thus the aperture ratio of the pixel can be increased.

The higher the proportion of the area of the transmissive region to the area of the pixel is, the larger the amount of transmitted light is. The proportion of the area of the transmissive region to the area of the pixel is, for example, greater than or equal to 1% and less than or equal to 95%, preferably greater than or equal to 10% and less than or equal to 90%, further preferably greater than or equal to 20% and less than or equal to 80%. A particularly preferable proportion is greater than or equal to 40% or greater than or equal to 50%, still preferably greater than or equal to 60% and less than or equal to 80%.

FIG. 18B is a cross-sectional view corresponding to a cross section along dashed-dotted line C-D in FIG. 18A2. FIG. 18B illustrates also cross sections of the liquid-crystal element 930LC, a coloring film 932CF, a light-blocking film 932BM, a capacitor 915, the driver circuit portion 901, and the like that are not illustrated in the top views. The driver circuit portion 901 can be used as a scan line driver circuit portion or a signal line driver circuit portion. The driver circuit portion 901 includes the transistor 911.

As illustrated in FIG. 18B, the BLU emits light in the direction of a dashed arrow. The light from the BLU is extracted to the outside through the transistor 914, the capacitor 915, and the like. Thus, films included in the transistor 914 and the capacitor 915 also preferably have a light-transmitting property. The increased area of the light-transmitting region of the transistor 914, the capacitor 915, and the like enables further efficient use of light from the BLU.

The light from the BLU may be extracted through the coloring film 932CF to the outside, as illustrated in FIG. 18B. The light through the coloring film 932CF can be colored in a desired color. The coloring film 932CF has a color selected from red (R), green (G), blue (B), cyan (C), magenta (M), yellow (Y), and the like.

Materials described below can be used for the transistors, wirings, capacitors, and the like illustrated in FIGS. 17A1, 17A2, and 17B and FIGS. 18A1, 18A2, and 18B.

A semiconductor film in the transistor can be formed with a light-transmitting semiconductor material. Examples of the light-transmitting semiconductor material include a metal oxide and an oxide semiconductor. An oxide semiconductor preferably contains at least indium. In particular, it preferably contains indium and zinc. In addition, one or more kinds of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

A conductive film in the transistor can be formed with a light-transmitting conductive material. The light-transmitting conductive material preferably contains one or more kinds of indium, zinc, and tin. Specifically, an In oxide, an In—Sn oxide (also referred to as an indium tin oxide or ITO), an In—Zn oxide, an In—W oxide, an In—W—Zn oxide, an In—Ti oxide, an In—Sn—Ti oxide, an In—Sn—Si oxide, a Zn oxide, a Ga—Zn oxide, or the like can be used.

The conductive film of the transistor may be an oxide semiconductor that includes an impurity element, for example, and has reduced resistance. The oxide semiconductor with the reduced resistance can be regarded as an oxide conductor (OC).

For example, to form an oxide conductor, oxygen vacancies are formed in an oxide semiconductor and then hydrogen is added to the oxygen vacancies, so that a donor level is formed in the vicinity of the conduction band. The oxide semiconductor having the donor level has an increased conductivity and becomes a conductor.

An oxide semiconductor has a large energy gap (e.g., an energy gap of 2.5 eV or larger), and thus has a visible light transmitting property. An oxide conductor is an oxide semiconductor having a donor level in the vicinity of the conduction band, as described above. Therefore, the influence of absorption due to the donor level is small in an oxide conductor, and an oxide conductor has a visible-light-transmitting property comparable to that of an oxide semiconductor.

The oxide conductor preferably includes one or more kinds of metal elements included in the semiconductor film of the transistor. When two or more layers included in the transistor are formed using the oxide semiconductors including the same metal element, the same manufacturing apparatus (e.g., deposition apparatus or processing apparatus) can be used in two or more steps and manufacturing cost can thus be reduced.

The structures of the pixel in the display device described in this embodiment enables efficient use of light emitted from one or both of the light-emitting element and the BLU. Thus, the excellent display device with reduced power consumption can be provided.

At least part of this embodiment can be implemented in combination with any of the other embodiments described in this specification as appropriate.

(Embodiment 5)
[Transistor]

The transistor includes the conductive layer functioning as the gate electrode, the semiconductor layer, the conductive layer functioning as the source electrode, the conductive layer functioning as the drain electrode, and the insulating layer functioning as a gate insulating layer.

FIG. 12 illustrates an example in which a bottom-gate transistor is used.

Note that there is no particular limitation on the structure of the transistor included in the display device of one embodiment of the present invention. For example, a planar transistor, a staggered transistor, or an inverted staggered transistor may be used. A top-gate transistor or a bottom-gate transistor may be used. Gate electrodes may be provided above and below a channel.

There is no particular limitation on the crystallinity of a semiconductor material used for the transistors, and an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of the transistor characteristics can be suppressed.

As a semiconductor material used for the transistors, a metal oxide whose energy gap is greater than or equal to 2 eV, preferably greater than or equal to 2.5 eV, further preferably greater than or equal to 3 eV can be used. A typical example thereof is a metal oxide containing indium, and for example, a CAC-OS described later or the like can be used.

A transistor with a metal oxide having a larger band gap and a lower carrier density than silicon has a low off-state current; therefore, charges stored in a capacitor that is series-connected to the transistor can be held for a long time.

The semiconductor layer can be, for example, a film represented by an In-M-Zn-based oxide that contains indium, zinc, and M (a metal such as aluminum, titanium, gallium, germanium, yttrium, zirconium, lanthanum, cerium, tin, neodymium, or hafnium).

In the case where the metal oxide contained in the semiconductor layer contains an In-M-Zn-based oxide, it is preferable that the atomic ratio of metal elements of a sputtering target used for forming a film of the In-M-Zn oxide satisfy In≥M and Zn≥M The atomic ratio of metal elements in such a sputtering target is preferably, for example, In:M:Zn=1:1:1, In:M:Zn=1:1:1.2, In:M:Zn=3:1:2, In:M:Zn=4:2:3, In:M:Zn=4:2:4.1, In:M:Zn=5:1:6, In:M:Zn=5:1:7, or In:M:Zn=5:1:8. Note that the atomic ratio of metal elements in the formed oxide semiconductor layer varies from the above atomic ratios of metal elements of the sputtering targets in a range of ±40%.

The bottom-gate transistor described as an example in this embodiment is preferable because the number of manufacturing steps can be reduced. When a metal oxide, which can be formed at a lower temperature than polycrystalline silicon, is used for the semiconductor layer, even materials with low heat resistance can be used for a wiring, an electrode, or a substrate below the semiconductor layer, so that the range of choices of materials can be widened. For example, an extremely large glass substrate can be favorably used.

A metal oxide film with a low carrier density is used as the semiconductor layer. For the semiconductor layer, for example, a metal oxide whose carrier density is lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$, even further preferably lower than $1\times10^{10}/cm^3$, and higher than or equal to $1\times10^{-9}/cm^3$ can be used. Such a metal oxide is referred to as a highly purified intrinsic or substantially highly purified intrinsic metal oxide. Such a metal oxide has a low impurity concentration and a low density of defect states and thus can be regarded as having stable characteristics.

Note that, without limitation to the above examples, a material with an appropriate composition may be used depending on required semiconductor characteristics and electrical characteristics (e.g., field-effect mobility and threshold voltage) of the transistor. To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When the metal oxide included in the semiconductor layer contains silicon or carbon, which are elements belonging to Group 14, the number of oxygen vacancies in the semiconductor layer is increased, so that an n-type layer is formed. Hence, the concentration of silicon or carbon (measured by secondary ion mass spectrometry) in the semiconductor layer is lower than or equal to $2\times10^{18}$ atoms/cm$^3$, preferably lower than or equal to $2\times10^{17}$ atoms/cm$^3$.

Alkali metal and alkaline earth metal might generate carriers when bonded to a metal oxide, in which case the off-state current of the transistor might be increased. Therefore, the concentration of alkali metal or alkaline earth metal in the semiconductor layer, which is measured by secondary ion mass spectrometry, is lower than or equal to $1\times10^{18}$ atoms/cm$^3$, preferably lower than or equal to $2\times10^{16}$ atoms/cm$^3$.

When the metal oxide included in the semiconductor layer contains nitrogen, electrons serving as carriers are generated and the carrier density is increased, so that the semiconductor layer easily becomes n-type. Thus, a transistor which includes a metal oxide containing nitrogen is likely to have normally-on characteristics. Hence, the nitrogen concentration in the semiconductor layer, which is measured by secondary ion mass spectrometry, is preferably lower than or equal to $5\times10^{18}$ atoms/cm$^3$.

The semiconductor layer may have a non-single-crystal structure, for example. The non-single-crystal structure includes a CAAC-OS (c-axis aligned crystalline oxide semiconductor or c-axis aligned a-b-plane-anchored crystalline oxide semiconductor) including a c-axis aligned crystal, a polycrystalline structure, a microcrystalline structure, or an amorphous structure, for example. Among the non-single-crystal structures, the amorphous structure has the highest density of defect states, whereas the CAAC-OS has the lowest density of defect states.

A metal oxide film having an amorphous structure has, for example, disordered atomic arrangement and no crystalline component. In other words, an oxide film having an amorphous structure has, for example, a completely amorphous structure and no crystal part.

Note that the semiconductor layer may be a mixed film including two or more of the following regions: a region having an amorphous structure, a region having a microcrystalline structure, a region having a polycrystalline structure, a CAAC-OS region, and a region having a single-crystal structure. The mixed film has, for example, a single-layer structure or a stacked structure including two or more of the above-mentioned regions in some cases.

<Composition of CAC-OS>

Described below is the composition of a cloud-aligned composite oxide semiconductor (CAC-OS) applicable to a transistor disclosed in one embodiment of the present invention.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in an active layer of a transistor is called an oxide semiconductor in some cases. In other words, an OS FET is a transistor including a metal oxide or an oxide semiconductor.

In this specification, a metal oxide in which regions functioning as a conductor and regions functioning as a dielectric are mixed and which functions as a semiconductor as a whole is defined as a CAC-OS or a CAC-metal oxide.

The CAC-OS has, for example, a composition in which elements included in an oxide semiconductor are unevenly distributed. Materials including unevenly distributed elements each have a size of greater than or equal to 0.5 nm and less than or equal to 10 nm, preferably greater than or equal to 0.5 nm and less than or equal to 3 nm, or a similar size. Note that in the following description of an oxide semiconductor, a state in which one or more elements are unevenly distributed and regions including the element(s) are mixed is referred to as a mosaic pattern or a patch-like pattern. The region has a size of greater than or equal to 0.5 nm and less than or equal to 10 nm, preferably greater than or equal to 0.5 nm and less than or equal to 3 nm, or a similar size.

The physical properties of a region including an unevenly distributed element are determined by the properties of the element. For example, a region including an unevenly distributed element which relatively tends to serve as an insulator among elements included in a metal oxide serves as a dielectric region. By contrast, a region including an unevenly distributed element which relatively tends to serve as a conductor among elements included in a metal oxide serves as a conductive region. A material in which conductive regions and dielectric regions are mixed to form a mosaic pattern serves as a semiconductor.

That is, a metal oxide in one embodiment of the present invention is a kind of matrix composite or metal matrix composite, in which materials having different physical properties are mixed.

Note that an oxide semiconductor preferably contains at least indium. In particular, indium and zinc are preferably contained. In addition, an element M (M is one or more of gallium, aluminum, silicon, boron, yttrium, copper, vanadium, beryllium, titanium, iron, nickel, germanium, zirconium, molybdenum, lanthanum, cerium, neodymium, hafnium, tantalum, tungsten, magnesium, and the like) may be contained.

For example, of the CAC-OS, an In—Ga—Zn oxide with the CAC composition (such an In—Ga—Zn oxide may be particularly referred to as CAC-IGZO) has a composition in which materials are separated into indium oxide (InO$_{X1}$, where X1 is a real number greater than 0) or indium zinc oxide (In$_{X2}$Zn$_{Y2}$O$_{Z2}$, where X2, Y2, and Z2 are real numbers greater than 0), and gallium oxide (GaO$_{X3}$, where X3 is a real number greater than 0) or gallium zinc oxide (Ga$_{X4}$Zn$_{Y4}$O$_{Z4}$, where X4, Y4, and Z4 are real numbers greater than 0), and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1+x0)}O_3(ZnO)_{mo}$ (−1≤x0≤1; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, silicon, boron, yttrium, copper, vanadium, beryllium, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected element(s) as a main component(s) are observed in part of the CAC-OS and nanoparticle regions including In as a main component are observed in part thereof, and these nanoparticle regions are randomly dispersed to form a mosaic pattern in the CAC-OS.

<Analysis of CAC-OS>

Next, measurement results of an oxide semiconductor over a substrate by a variety of methods will be described.

<<Structure of Samples and Formation Method Thereof>>

Nine samples of one embodiment of the present invention are described below. The samples are formed at different substrate temperatures and with different ratios of an oxygen gas flow rate in formation of the oxide semiconductor. Note that each sample includes a substrate and an oxide semiconductor over the substrate.

A method for forming the samples will be described.

A glass substrate is used as the substrate. Over the glass substrate, a 100-nm-thick In—Ga—Zn oxide is formed as an oxide semiconductor with a sputtering apparatus. The formation conditions are as follows: the pressure in a chamber is 0.6 Pa, and an oxide target (with an atomic ratio of In:Ga:Zn=4:2:4.1) is used as a target. The oxide target provided in the sputtering apparatus is supplied with an AC power of 2500 W.

As for the conditions in the formation of the oxide of the nine samples, the substrate temperature is set to a temperature that is not increased by heating (hereinafter such a temperature is also referred to as room temperature or R.T.), to 130° C., and to 170° C. The ratio of a flow rate of an oxygen gas to a flow rate of a mixed gas of Ar and oxygen (also referred to as an oxygen gas flow rate ratio) is set to 10%, 30%, and 100%.

<<Analysis by X-ray Diffraction>>

In this section, results of X-ray diffraction (XRD) measurement performed on the nine samples are described. As an XRD apparatus, D8 ADVANCE manufactured by Bruker AXS is used. The conditions are as follows: scanning is performed by an out-of-plane method at θ/2θ, the scanning range is 15 deg. to 50 deg., the step width is 0.02 deg., and the scanning speed is 3.0 deg./min.

Figure 19:
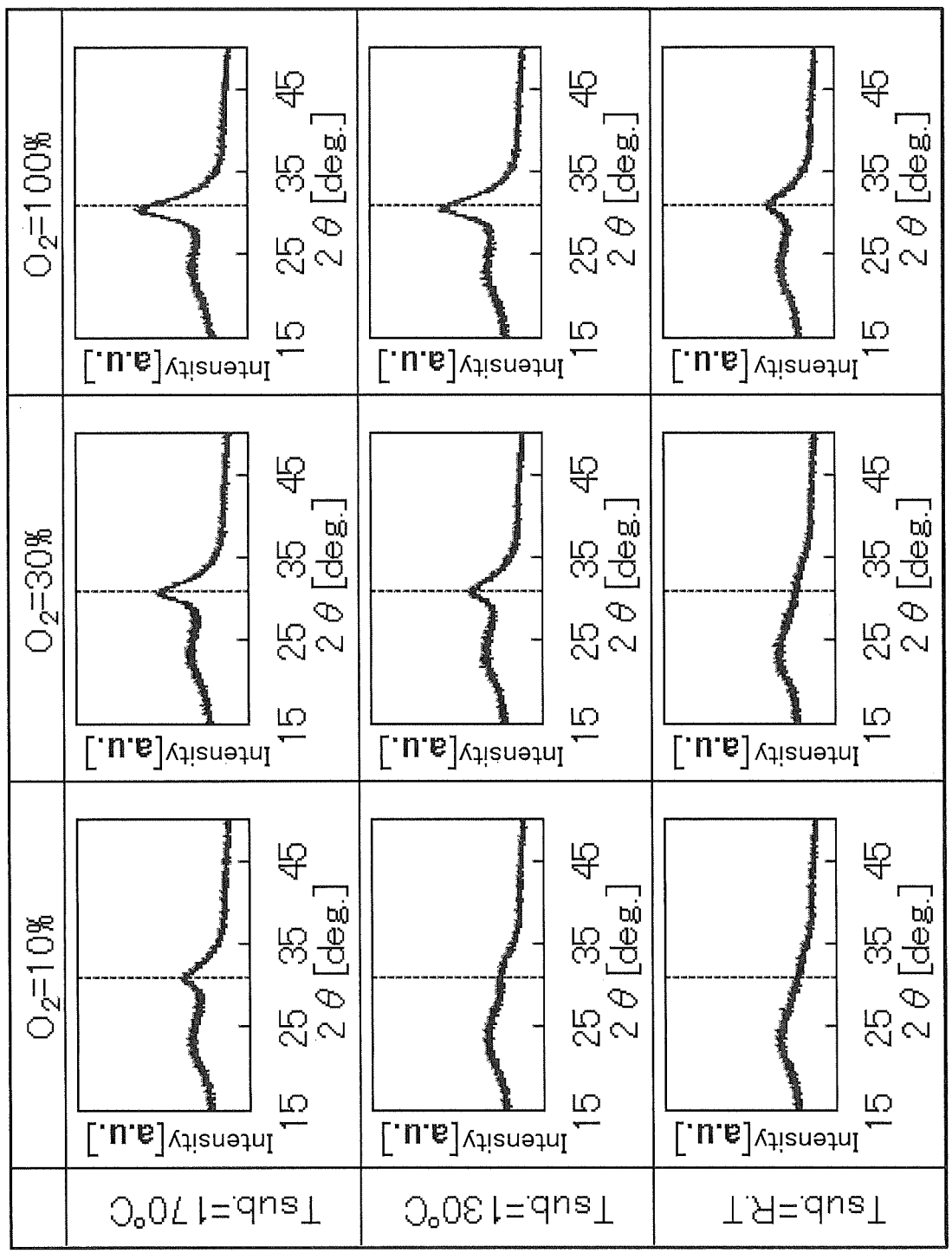
FIG. 19 shows measured XRD spectra of samples.

FIG. 19 shows XRD spectra measured by an out-of-plane method. In FIG. 19, the top row shows the measurement results of the samples formed at a substrate temperature of 170° C.; the middle row shows the measurement results of the samples formed at a substrate temperature of 130° C.; the bottom row shows the measurement results of the samples formed at a substrate temperature of R.T. The left column shows the measurement results of the samples formed with an oxygen gas flow rate ratio of 10%; the middle column shows the measurement results of the samples formed with an oxygen gas flow rate ratio of 30%; the right column shows the measurement results of the samples fanned with an oxygen gas flow rate ratio of 100%.

In the XRD spectra shown in FIG. 19, the higher the substrate temperature at the time of formation is or the higher the oxygen gas flow rate ratio at the time of formation is, the higher the intensity of the peak at around 2θ=31° is. Note that it is found that the peak at around 2θ=31° is assigned to a crystalline IGZO compound whose c-axes are aligned in a direction substantially perpendicular to a formation surface or a top surface of the crystalline IGZO compound (such a compound is also referred to as c-axis aligned crystalline (CAAC) IGZO).

As shown in the XRD spectra in FIG. 19, as the substrate temperature at the time of formation is lower or the oxygen gas flow rate ratio at the time of formation is lower, a peak becomes less clear. Accordingly, it is found that there are no alignment in the a-b plane direction and c-axis alignment in the measured areas of the samples that are formed at a lower substrate temperature or with a lower oxygen gas flow rate ratio.

<<Analysis with Electron Microscope>>

This section describes the observation and analysis results of the samples formed at a substrate temperature of R.T. and with an oxygen gas flow rate ratio of 10% with a high-angle annular dark-field scanning transmission electron microscope (HAADF-STEM). An image obtained with an HAADF-STEM is also referred to as a TEM image.

Described are the results of image analysis of plan-view images and cross-sectional images obtained with an HAADF-STEM (also referred to as plan-view TEM images and cross-sectional TEM images, respectively). The TEM images are observed with a spherical aberration corrector function. The HAADF-STEM images are obtained using an atomic resolution analytical electron microscope JEM-ARM200F manufactured by JEOL Ltd. under the following conditions: the acceleration voltage is 200 kV, and irradiation with an electron beam with a diameter of approximately 0.1 nm is performed.

FIG. 20A is a plan-view TEM image of the sample formed at a substrate temperature of R.T. and with an oxygen gas flow rate ratio of 10%. FIG. 20B is a cross-sectional TEM image of the sample formed at a substrate temperature of R.T. and with an oxygen gas flow rate ratio of 10%.

<<Analysis of Electron Diffraction Patterns>>

This section describes electron diffraction patterns obtained by irradiation of the sample formed at a substrate temperature of R.T. and an oxygen gas flow rate ratio of 10% with an electron beam with a probe diameter of 1 nm (also referred to as a nanobeam).

Electron diffraction patterns of points indicated by black dots a1, a2, a3, a4, and a5 in the plan-view TEM image in FIG. 20A of the sample formed at a substrate temperature of R.T. and an oxygen gas flow rate ratio of 10% are observed. Note that the electron diffraction patterns are observed while electron beam irradiation is performed at a constant rate for 35 seconds. FIGS. 20C, 20D, 20E, 20F, and 20G show the results of the points indicated by the black dots a1, a2, a3, a4, and a5, respectively.

In FIGS. 20C, 20D, 20E, 20F, and 20G, regions with high luminance in a circular (ring) pattern can be shown. Furthermore, a plurality of spots can be shown in a ring-like shape.

Electron diffraction patterns of points indicated by black dots b1, b2, b3, b4, and b5 in the cross-sectional TEM image in FIG. 20B of the sample formed at a substrate temperature of R.T. and an oxygen gas flow rate ratio of 10% are observed. FIGS. 20H, 20I, 20J, 20K, and 20L show the results of the points indicated by the black dots b1, b2, b3, b4, and b5, respectively.

In FIGS. 20H, 20I, 20J, 20K, and 20L, regions with high luminance in a ring pattern can be shown. Furthermore, a plurality of spots can be shown in a ring-like shape.

For example, when an electron beam with a probe diameter of 300 nm is incident on a CAAC-OS including an $InGaZnO_4$ crystal in a direction parallel to the sample surface, a diffraction pattern including a spot derived from the (009) plane of the $InGaZnO_4$ crystal is obtained. That is, the CAAC-OS has c-axis alignment and the c-axes are aligned in the direction substantially perpendicular to the formation surface or the top surface of the CAAC-OS. Meanwhile, a ring-like diffraction pattern is shown when an electron beam with a probe diameter of 300 nm is incident on the same sample in a direction perpendicular to the sample surface. That is, it is found that the CAAC-OS has neither a-axis alignment nor b-axis alignment.

Furthermore, a diffraction pattern like a halo pattern is observed when an oxide semiconductor including a nanocrystal (a nanocrystalline oxide semiconductor (nc-OS)) is subjected to electron diffraction using an electron beam with a large probe diameter (e.g., 50 nm or larger). Meanwhile, bright spots are shown in a nanobeam electron diffraction pattern of the nc-OS obtained using an electron beam with a small probe diameter (e.g., smaller than 50 nm). Furthermore, in a nanobeam electron diffraction pattern of the nc-OS, regions with high luminance in a circular (ring) pattern are shown in some cases. Also in a nanobeam electron diffraction pattern of the nc-OS, a plurality of bright spots are shown in a ring-like shape in some cases.

The electron diffraction pattern of the sample formed at a substrate temperature of R.T. and with an oxygen gas flow rate ratio of 10% has regions with high luminance in a ring pattern and a plurality of bright spots appear in the ring-like pattern. Accordingly, the sample formed at a substrate temperature of R.T. and with an oxygen gas flow rate ratio of 10% exhibits an electron diffraction pattern similar to that of the nc-OS and does not show alignment in the plane direction and the cross-sectional direction.

According to what is described above, an oxide semiconductor formed at a low substrate temperature or with a low oxygen gas flow rate ratio is likely to have characteristics distinctly different from those of an oxide semiconductor film having an amorphous structure and an oxide semiconductor film having a single crystal structure.

<<Elementary Analysis>>

This section describes the analysis results of elements included in the sample formed at a substrate temperature of R.T. and with an oxygen gas flow rate ratio of 10%. For the analysis, by energy dispersive X-ray spectroscopy (EDX), EDX mapping images are obtained. An energy dispersive X-ray spectrometer AnalysisStation JED-2300T manufactured by JEOL Ltd. is used as an elementary analysis apparatus in the EDX measurement. A Si drift detector is used to detect an X-ray emitted from the sample.

In the EDX measurement, an EDX spectrum of a point is obtained in such a manner that electron beam irradiation is performed on the point in a detection target region of a sample, and the energy of characteristic X-ray of the sample generated by the irradiation and its frequency are measured. In this embodiment, peaks of an EDX spectrum of the point are attributed to electron transition to the L shell in an In atom, electron transition to the K shell in a Ga atom, and electron transition to the K shell in a Zn atom and the K shell in an O atom, and the proportions of the atoms in the point are calculated. An EDX mapping image indicating distributions of proportions of atoms can be obtained through the process in an analysis target region of a sample.

Figure 21A:
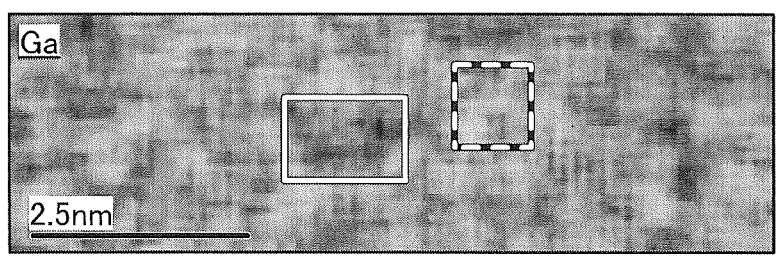
FIGS. 21A to 21C show EDX mapping images of a sample.
Figure 21B:
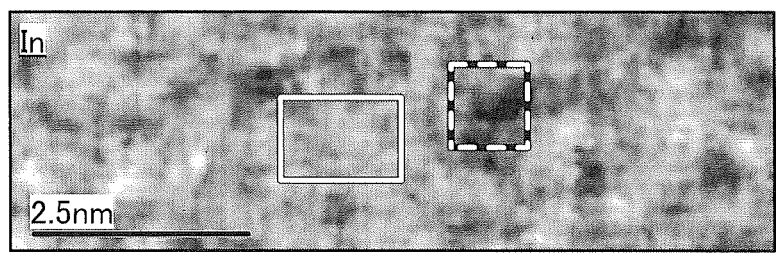
Figure 21C:
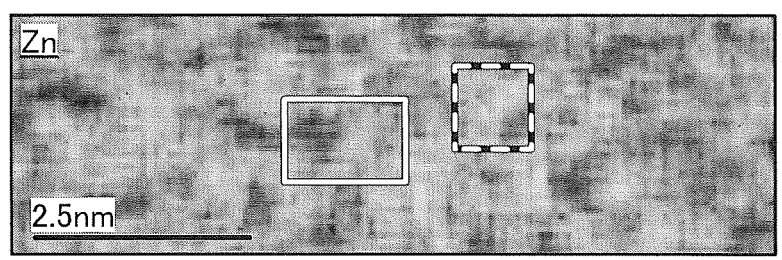

FIGS. 21A to 21C show EDX mapping images in a cross section of the sample formed at a substrate temperature of R.T. and with an oxygen gas flow rate ratio of 10%. FIG. 21A shows an EDX mapping image of Ga atoms. The proportion of the Ga atoms in all the atoms is 1.18 atomic % to 18.64 atomic %. FIG. 21B shows an EDX mapping image of In atoms. The proportion of the In atoms in all the atoms is 9.28 atomic % to 33.74 atomic %. FIG. 21C shows an EDX mapping image of Zn atoms. The proportion of the Zn atoms in all the atoms is 6.69 atomic % to 24.99 atomic %. FIGS. 21A to 21C show the same region in the cross section of the sample formed at a substrate temperature of R.T. and with an oxygen gas flow rate ratio of 10%. In the EDX mapping images, the proportion of an element is indicated by grayscale: the more measured atoms exist in a region, the brighter the region is; the less measured atoms exist in a region, the darker the region is. The magnification of the EDX mapping images in FIGS. 21A to 21C is 7200000 times.

The EDX mapping images in FIGS. 21A to 21C show relative distribution of brightness indicating that each element has a distribution in the sample formed at a substrate temperature of R.T. and with an oxygen gas flow rate ratio of 10%. Areas surrounded by solid lines and areas surrounded by dashed lines in FIGS. 21A to 21C are examined.

In FIG. 21A, a relatively dark region occupies a large area in the area surrounded by the solid line, while a relatively bright region occupies a large area in the area surrounded by the dashed line. In FIG. 21B, a relatively bright region occupies a large area in the area surrounded by the solid line, while a relatively dark region occupies a large area in the area surrounded by the dashed line.

That is, the areas surrounded by the solid lines are regions including a relatively large number of In atoms and the areas surrounded by the dashed lines are regions including a relatively small number of In atoms. In FIG. 21C, the right portion of the area surrounded by the solid line is relatively bright and the left portion thereof is relatively dark. Thus, the area surrounded by the solid line is a region including $In_{X2}Zn_{Y2}O_{Z2}$, $InO_{X1}$, or the like as a main component.

The area surrounded by the solid line is a region including a relatively small number of Ga atoms and the area surrounded by the dashed line is a region including a relatively large number of Ga atoms. In FIG. 21C, the upper left portion of the area surrounded by the dashed line is relatively bright and the lower right portion thereof is relatively dark. Thus, the area surrounded by the dashed line is a region including $GaO_{X3}$, $Ga_{X4}Zn_{Y4}O_{Z4}$, or the like as a main component.

Furthermore, as shown in FIGS. 21A to 21C, the In atoms are relatively more uniformly distributed than the Ga atoms, and regions including $InO_{X1}$ as a main component are seemingly joined to each other through a region including $In_{X2}Zn_{Y2}O_{Z2}$ as a main component. Thus, the regions including $In_{X2}Zn_{Y2}O_{Z2}$ and $InO_{X1}$ as main components extend like a cloud.

An In—Ga—Zn oxide having a composition in which the regions including $GaO_{X3}$ or the like as a main component and the regions including $In_{X2}Zn_{Y2}O_{Z2}$ or $InO_{X1}$ as a main component are unevenly distributed and mixed can be referred to as a CAC-OS.

The crystal structure of the CAC-OS includes an nc structure. In an electron diffraction pattern of the CAC-OS with the nc structure, several or more bright spots appear in addition to bright sports derived from IGZO including a single crystal, a polycrystal, or a CAAC. Alternatively, the crystal structure is defined as having high luminance regions appearing in a ring pattern in addition to the several or more bright spots.

As shown in FIGS. 21A to 21C, each of the regions including $GaO_{X3}$ or the like as a main component and the regions including $In_{X2}Zn_{Y2}O_{Z2}$ or $InO_{X1}$ as a main component has a size of greater than or equal to 0.5 nm and less than or equal to 10 nm, or greater than or equal to 1 nm and less than or equal to 3 nm. Note that it is preferable that a diameter of a region including each metal element as a main component be greater than or equal to 1 nm and less than or equal to 2 nm in the EDX mapping images.

As described above, the CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility ($\mu$) can be achieved.

By contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current ($I_{on}$) and high field-effect mobility ($\mu$) can be achieved.

A semiconductor element including a CAC-OS has high reliability. Thus, the CAC-OS is suitably used in a variety of semiconductor devices typified by a display.

Since a transistor including a CAC-OS in a semiconductor layer has high field-effect mobility and high driving capability, the use of the transistor in a driver circuit, a typical example of which is a gate line driver circuit that generates a gate signal, allows a display device to have a narrow bezel. Moreover, the use of the transistor in a signal line driver circuit that is included in a display device and supplies a signal from a signal line (particularly in a demultiplexer connected to an output terminal of a shift register included in the signal line driver circuit) can reduce the number of wirings connected to the display device.

The transistor including a CAC-OS in the semiconductor layer does not need a laser crystallization step necessary for a transistor including low-temperature polysilicon. Thus, the manufacturing cost of a display device can be reduced even when the display device is formed using a large substrate. In addition, it is preferable to use the transistor including a CAC-OS in the semiconductor layer for a driver circuit and a display portion in a large display device having high resolution such as ultra-high definition ("4K resolution," "4K2K," and "4K") or super high definition ("8K resolution," "8K4K," and "8K"), in which case writing can be performed in a short time and display defects can be reduced.

Alternatively, silicon may be used as a semiconductor in which a channel of the transistor is formed. Although amorphous silicon may be used as silicon, silicon having crystallinity is particularly preferable. For example, microcrystalline silicon, polycrystalline silicon, or single-crystal silicon is preferably used. In particular, polycrystalline silicon can be formed at a lower temperature than single-crystal silicon and has higher field-effect mobility and a higher reliability than amorphous silicon.

The bottom-gate transistor described as an example in this embodiment is preferable because the number of manufacturing steps can be reduced. When amorphous silicon, which can be formed at a lower temperature than polycrystalline silicon, is used for the semiconductor layer, even materials with low heat resistance can be used for a wiring, an electrode, or a substrate below the semiconductor layer, so that the range of choices of materials can be widened. For example, an extremely large glass substrate can be favorably used. Meanwhile, a top-gate transistor is preferable because an impurity region is easily formed in a self-aligned manner and variation in characteristics or the like can be reduced. The top-gate transistor is particularly preferable when polycrystalline silicon, single-crystal silicon, or the like is employed.

At least part of this embodiment can be implemented in combination with any of the other embodiments described in this specification as appropriate.

This application is based on Japanese Patent Application Serial No. 2016-224110 filed with Japan Patent Office on Nov. 17, 2016, the entire contents of which are hereby incorporated by reference.

What is claimed is:

1. An electronic device comprising:
   a first touch sensor;
   a second touch sensor;
   a third touch sensor; and
   a display panel,
   wherein the first touch sensor overlaps with the display panel,
   wherein the display panel comprises a first side and a second side,
   wherein the second touch sensor is along the first side,
   wherein the third touch sensor is along the second side,
   wherein the first side and the second side intersect with each other,
   wherein the second touch sensor is configured to output a first touch coordinate after detecting touch,
   wherein the third touch sensor is configured to output a second touch coordinate after detecting touch,
   wherein the display panel is configured to display a first region extending from the first touch coordinate in a direction perpendicular to a long side of the second touch sensor, and
   wherein the display panel is configured to display a second region extending from the second touch coordinate in a direction perpendicular to a long side of the third touch sensor.

2. The electronic device according to claim 1, wherein the display panel comprises three or more sides.

3. The electronic device according to claim 1,
   wherein the display panel comprises a display region,
   wherein the display region comprises a pixel,
   wherein the pixel comprises a first pixel circuit and a second pixel circuit,
   wherein the first pixel circuit comprises a first display element,
   wherein the second pixel circuit comprises a second display element,
   wherein the first display element comprises a reflective electrode,
   wherein the reflective electrode comprises an opening region or a notch region, and
   wherein the second display element is configured to emit light that passes the opening region or the notch region.

4. The electronic device according to claim 3, wherein the first display element is a reflective liquid crystal element.

5. The electronic device according to claim 3, wherein the second display element is a light-emitting element.

6. The electronic device according to claim 3, wherein the first display element is configured to reflect light from the outside by the reflective electrode to display an image.

7. The electronic device according to claim 3, wherein the electronic device is configured to display an image using one or both of first light reflected from the first display element and second light emitted from the second display element.

8. The electronic device according to claim 3,
   wherein the pixel comprises a transistor, and
   wherein the transistor comprises a metal oxide in a semiconductor layer.

9. The electronic device according to claim 8, wherein the transistor comprises a back gate.

10. The electronic device according to claim 1,
    wherein the display panel comprises a third region where the first region and the second region intersect with each other,
    wherein the electronic device is configured to extract a display object displayed in a region overlapping with the third region, and
    wherein the electronic device is configured to execute an application program associated with the display object.

11. The electronic device according to claim 1,
    wherein the electronic device further comprises a first housing, a first switch, and a second switch,
    wherein the first switch is positioned near the second touch sensor,
    wherein the second switch is positioned near the third touch sensor,
    wherein the first region is deselected when a detection signal from the first switch is detected, and
    wherein the second region is deselected when a detection signal from the second switch is detected.

12. The electronic device according to claim 11, wherein a gray level or a color tone of a display object in the third region is changed to clearly show that the display object is selected.

13. An electronic device comprising:
    a first housing; and
    a second housing,
    wherein the first housing comprises a structure for storing the second housing,
    wherein the first housing comprises a second touch sensor, a third touch sensor, a first switch, a second switch, a first communication module, and an opening region,
    wherein the second housing comprises a display panel, a first touch sensor, a processor, and a second communication module,
    wherein the opening region is positioned to overlap with the display panel,
    wherein the first communication module is configured to transmit touch coordinate data detected by one of the second touch sensor and the third touch sensor to the second communication module,
    wherein the first communication module is configured to transmit a detection signal detected by one of the first switch and the second switch to the second communication module,
    wherein the processor is configured to receive the touch coordinate data or the detection signal via the second communication module, and
    wherein the processor is configured to control display on the display panel by using one of the received touch coordinate data and the received detection signal.

14. The electronic device according to claim 13,
    wherein the display panel comprises a display region,
    wherein the display region comprises a pixel,
    wherein the pixel comprises a first pixel circuit and a second pixel circuit,
    wherein the first pixel circuit comprises a first display element,
    wherein the second pixel circuit comprises a second display element,
    wherein the first display element comprises a reflective electrode,
    wherein the reflective electrode comprises an opening region or a notch region, and
    wherein the second display element is configured to emit light that passes the opening region or the notch region of the reflective electrode.

15. The electronic device according to claim 14, wherein the first display element is a reflective liquid crystal element.

16. The electronic device according to claim 14, wherein the second display element is a light-emitting element.

17. The electronic device according to claim 14, wherein the electronic device is configured to display an image using one or both of first light reflected from the first display element and second light emitted from the second display element.

18. The electronic device according to claim 14,
wherein the pixel comprises a transistor, and
wherein the transistor comprises a metal oxide in a semiconductor layer.

19. The electronic device according to claim 18, wherein the transistor comprises a back gate.

* * * * *